(12) United States Patent
Zhu et al.

(10) Patent No.: US 11,996,917 B2
(45) Date of Patent: May 28, 2024

(54) PRECODING MATRIX DETERMINING METHOD, DEVICE, AND SYSTEM

(71) Applicant: HUAWEI TECHNOLOGIES CO., LTD., Guangdong (CN)

(72) Inventors: Qian Zhu, Shenzhen (CN); Yi Lv, Shenzhen (CN); Rui Ni, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 55 days.

(21) Appl. No.: 17/743,875

(22) Filed: May 13, 2022

(65) Prior Publication Data

US 2022/0271806 A1 Aug. 25, 2022

Related U.S. Application Data

(63) Continuation of application No. PCT/CN2020/124542, filed on Oct. 28, 2020.

(30) Foreign Application Priority Data

Nov. 14, 2019 (CN) .......................... 201911115463.1

(51) Int. Cl.
  *H04B 7/0456* (2017.01)
(52) U.S. Cl.
  CPC .................................. *H04B 7/0456* (2013.01)
(58) Field of Classification Search
  CPC .. H04B 7/0456; H04B 7/0617; H04B 7/0417; H04B 7/0421; H04B 7/0691;

(Continued)

(56) References Cited

U.S. PATENT DOCUMENTS

2008/0219375 A1 9/2008 Yun et al.
2015/0326297 A1 11/2015 Petersson et al.
(Continued)

FOREIGN PATENT DOCUMENTS

CN   106209195 A   12/2016
CN   106233659 A   12/2016
(Continued)

OTHER PUBLICATIONS

Peng et al., "Wideband hybrid precoder design in MU-MIMO based on channel angular information," 2017 IEEE 18th International Workshop on Signal Processing Advances in Wireless Communications (SPAWC), Jul. 3, 2017, 5 pages.

(Continued)

*Primary Examiner* — Sophia Vlahos
(74) *Attorney, Agent, or Firm* — Fish & Richardson P.C.

(57) ABSTRACT

The present disclosure relates to precoding matrix determining methods, devices, and systems. In one example method, a receive end device obtains channel state information (CSI) of a first channel and information about P antenna port groups of a transmit end device. The receive end device determines V orbital angular momentum (OAM) mode groups based on the CSI of the first channel and first OAM modes, determines a first precoding matrix based on the P antenna port groups of the transmit end device and the V OAM mode groups, and sends, to the transmit end device, first indication information indicating the first precoding matrix. The transmit end device receives the first indication information, and determines the first precoding matrix based on the first indication information.

19 Claims, 9 Drawing Sheets

(58) Field of Classification Search
CPC .... H04B 7/0848; H04B 7/022; H04B 7/0452; H04B 7/0413; H04B 7/0857; H04B 7/0854; H04L 5/0035; H04L 5/0016; H04L 5/0023; H04J 11/0059; H04W 24/10; Y02D 30/70

See application file for complete search history.

(56) References Cited

U.S. PATENT DOCUMENTS

| | | | | |
|---|---|---|---|---|
| 2020/0296599 | A1* | 9/2020 | Sasaki | H04B 7/0617 |
| 2021/0021053 | A1* | 1/2021 | Sasaki | H01Q 21/20 |

FOREIGN PATENT DOCUMENTS

| | | |
|---|---|---|
| CN | 106537814 A | 3/2017 |
| CN | 107346982 A | 11/2017 |
| CN | 108463954 A | 8/2018 |
| CN | 109644068 A | 4/2019 |
| CN | 110022171 A | 7/2019 |
| JP | 2019083475 A | 5/2019 |
| WO | 2016164146 A2 | 10/2016 |
| WO | 2019189705 A1 | 10/2019 |

OTHER PUBLICATIONS

3GPP TS 38.211 V15.6.0 (Jun. 2019), "3rd Generation Partnership Project; Technical Specification Group Radio Access Network; NR; Physical channels and modulation; (Release 15)," Jun. 2019, 97 pages.

Nokia, Alcatel-Lucent Shanghai Bell, "On the channel reciprocity support for CSI acquisition," 3GPP TSG RAN WG1#89, R1-1708914, Hangzhou, China, May 15-19, 2017, 4 pages.

3GPP TS 38.212 V15.6.0 (Jun. 2019), "3rd Generation Partnership Project; Technical Specification Group Radio Access Network; NR; Multiplexing and channel coding(Release 15)," Jun. 2019, 101 pages.

3GPP TS 38.214 V15.6.0 (2019-06), "3rd Generation Partnership Project; Technical Specification Group Radio Access Network; NR; Physical layer procedures for data (Release 15)," Jun. 2019, 105 pages.

Office Action in Chinese Appln. No. 201911115463.1, dated Dec. 7, 2021, 7 pages (with English translation).

Supplementary European Search Report in European Appln No. 20887088, dated Oct. 27, 2022, 12 pages.

International Search Report and Written Opinion in International Appln. No. PCT/CN2020/124542, dated Jan. 27, 2021, 16 pages (with English translation).

Chen et al., "Misalignment-Robust Receiving Scheme for UCA-Based OAM Communication Systems," 2017 IEEE 85th Vehicular Technology Conference (VTC Spring), Jun. 4-7, 2017, 5 pages.

Extended European Search Report in European Appln No. 20887088.1, dated Feb. 13, 2023, 12 pages.

* cited by examiner

PRECODING MATRIX DETERMINING METHOD, DEVICE, AND SYSTEM

CROSS-REFERENCE TO RELATED APPLICATIONS

This application is a continuation of International Application No. PCT/CN2020/124542, filed on Oct. 28, 2020, which claims priority to Chinese Patent Application No. 201911115463.1, filed on Nov. 14, 2019. The disclosures of the aforementioned applications are hereby incorporated by reference in their entireties.

TECHNICAL FIELD

This application relates to the field of communications technologies, and in particular, to a precoding matrix determining method, a device, and a system.

BACKGROUND

In a 5th generation (5th generation, 5G) network, a multiple-input multiple-output (multiple-input multiple-output, MIMO) technology is widely applied. The MIMO technology is to use a plurality of transmit antennas and receive antennas respectively at a transmit end and a receive end, to transmit and receive data through the plurality of antennas at the transmit end and the receive end.

In a conventional data transmission solution based on a MIMO technology, a transmit end device obtains channel state information (channel state information, CSI) of a channel in a channel sounding manner. Then, when sending data, the transmit end device may determine a precoding matrix based on the CSI of the channel, map different transport layers to different antenna ports based on the precoding matrix, and finally, map the antenna ports to physical antennas by using a spatial filter; and the physical antennas send the data.

However, in this solution, in a channel environment with a large line of sight component, a MIMO channel is degraded into a single-input single-output (single-input single-output, SISO) channel, that is, the MIMO channel can only support single-stream signal transmission, and space division multiplexing cannot be used to improve spectral efficiency. Therefore, in a channel environment with a large line of sight component, how to improve performance of conventional MIMO and increase spectrum utilization is a problem urgent to be resolved at present.

SUMMARY

Embodiments of this application provide a precoding matrix determining method, a device, and a system, to improve performance of conventional MIMO, and improve spectral efficiency.

To achieve the foregoing objective, the following technical solutions are used in the embodiments of this application.

According to a first aspect, a precoding matrix determining method and a corresponding apparatus are provided. In this solution, a receive end apparatus obtains channel state information (CSI) of a first channel and information about P antenna port groups of a transmit end apparatus, where P is a positive integer; the receive end apparatus determines V orbital angular momentum (OAM) mode groups based on the CSI of the first channel and first OAM modes, where the first OAM modes are OAM modes supported by both the transmit end apparatus and the receive end apparatus, and V is a positive integer less than or equal to P; the receive end apparatus determines a first precoding matrix based on the P antenna port groups and the V OAM mode groups, where the first precoding matrix includes P*V second preceding matrices, and the first precoding matrix is used to precode first data; and the receive end apparatus sends first indication information to the transmit end apparatus, where the first indication information is used to indicate the first precoding matrix. Based on this solution, OAM modes may be introduced into a precoding matrix, so that OAM is integrated into a precoding process of conventional MIMO, thereby improving performance of the conventional MIMO by using the OAM in MIMO communication, and further improving spectral efficiency.

In a possible design, the precoding matrix determining method further includes: the receive end apparatus determines, based on the CSI of the first channel, that a line of sight exists in the first channel. Based on this solution, in a scenario with a line of sight existing in a channel, the first precoding matrix provided in the embodiments of this application is used to precode to-be-sent data, thereby improving performance of conventional MIMO by using OAM, and improving spectral efficiency.

In a possible design, the CSI of the first channel includes a channel matrix corresponding to the first channel; and that the receive end apparatus determines, based on the CSI of the first channel, that a line of sight exists in the first channel includes: if a difference between a rank of the channel matrix corresponding to the first channel and 1 is less than a first threshold, or the rank of the channel matrix corresponding to the first channel matrix is less than a second threshold, the receive end apparatus determines that a line of sight exists in the first channel.

In a possible design, the CSI of the first channel includes a channel matrix corresponding to the first channel; and that the receive end apparatus determines, based on the CSI of the first channel, that a line of sight exists in the first channel includes: if a ratio of a maximum singular value to a minimum singular value is greater than a third threshold, the receive end apparatus determines that a line of sight exists in the first channel, where the maximum singular value and the minimum singular value are obtained by performing singular value decomposition on the channel matrix corresponding to the first channel.

In a possible design, the CSI of the first channel includes a channel matrix corresponding to the first channel; and that the receive end apparatus determines, based on the CSI of the first channel, that a line of sight exists in the first channel includes: if a difference between a rank of the channel matrix corresponding to the first channel and 1 is less than a first threshold, and a ratio of a maximum singular value to a minimum singular value is greater than a third threshold, the receive end apparatus determines that a line of sight exists in the first channel, where the maximum singular value and the minimum singular value are obtained by performing singular value decomposition on the channel matrix corresponding to the first channel; or if a rank of the channel matrix corresponding to the first channel matrix is less than a second threshold, and a ratio of the maximum singular value to the minimum singular value is greater than a third threshold, the receive end apparatus determines that a line of sight exists in the first channel.

In a possible design, the precoding matrix determining method further includes: the receive end apparatus receives first information from the transmit end apparatus, where the first information is a first phase compensation value, or the first information is information about a direction of the receive end apparatus relative to the transmit end apparatus and location information of an antenna array of the transmit end apparatus; and the receive end apparatus determines the first phase compensation value based on the first information, where the first phase compensation value is a phase compensation value corresponding to the receive end apparatus. Based on this solution, the receive end apparatus may be enabled to perform phase compensation, so as to reduce inter-mode crosstalk of the receive end apparatus, and improve an OAM signal demodulation capability of the receive end apparatus.

In a possible design, the receive end apparatus is a first terminal device, the transmit end apparatus is a network device, and the precoding matrix determining method further includes: the first terminal device determines, based on the first precoding matrix, the CSI of the first channel, and a receiving capability of the first terminal device, a channel quality indicator (CQI) group corresponding to the first precoding matrix, where the CQI group includes a CQI corresponding to each of OAM modes corresponding to the first precoding matrix; and the first terminal device sends the CQI group to the network device. Based on this solution, the network device may be enabled to adjust a data modulation scheme and a data code rate based on an OAM mode and a CQI, thereby improving data transmission flexibility and increasing a transmission rate.

In a possible design, the receive end apparatus is a network device, the transmit end apparatus is a first terminal device, the first precoding matrix is different from a precoding matrix indicated by the network device to a second terminal device, the second terminal device is one or more terminal devices served by the network device other than the first terminal device, the precoding matrix indicated by the network device to the second terminal device is determined by the network device based on CSI of a second channel, and the second channel is used by the second terminal device to send data to the network device. Based on this solution, because the network device schedules different precoding matrices for a plurality of terminal devices communicating with the network device, interference between users can be reduced during simultaneous co-channel transmission.

According to a second aspect, a precoding matrix determining method and a corresponding apparatus are provided. In this solution, a transmit end apparatus receives first indication information from a receive end apparatus, where the first indication information is used to indicate a first precoding matrix, the first precoding matrix includes P*V second precoding matrices, the first precoding matrix is used to precode first data, P represents a quantity of antenna port groups of the transmit end apparatus, V represents a quantity of orbital angular momentum (OAM) mode groups, P is a positive integer, and V is a positive integer less than or equal to P; and the transmit end apparatus determines the first precoding matrix based on the first indication information. For the technical effects brought by the second aspect, refer to the technical effects brought by the first aspect, and details are not described herein again.

In a possible design, the precoding matrix determining method further includes: the transmit end apparatus determines the P antenna port groups of the transmit end apparatus based on information about an antenna array of the transmit end apparatus; and the transmit end apparatus sends information about the P antenna port groups of the transmit end apparatus to the receive end apparatus.

In a possible design, the precoding matrix determining method further includes: the transmit end apparatus receives second information from the receive end apparatus, where the second information is a second phase reference signal, or the second information is information about a direction of the transmit end apparatus relative to the receive end apparatus and location information of an antenna array of the receive end apparatus; and the transmit end apparatus determines a second phase compensation value based on the second information, where the second phase compensation value is a phase compensation value corresponding to the transmit end apparatus.

In a possible design, that the first precoding matrix is used to precode first data includes: the first precoding matrix is used to determine a fourth precoding matrix, and the fourth precoding matrix is used to precode the first data.

In a possible design, the transmit end apparatus is a network device, the receive end apparatus is a first terminal device, the fourth precoding matrix is different from a fifth precoding matrix, the fifth precoding matrix is determined by using a sixth precoding matrix indicated by a second terminal device to the network device, the second terminal device is one or more terminal devices served by the network device other than the first terminal device, the sixth precoding matrix is determined by using CSI of a third channel, and the third channel is used by the network device to send data to the second terminal device. Based on this solution, because the network device schedules different precoding matrices for a plurality of terminal devices communicating with the network device, interference between users can be reduced during simultaneous co-channel transmission.

In a possible design, array elements in the antenna array of the transmit end apparatus that correspond to a first antenna port group are not distributed on a same straight line, and the first antenna port group is any one of the P antenna port groups of the transmit end apparatus.

According to a third aspect, a precoding matrix determining method and a corresponding apparatus are provided. In this solution, a transmit end apparatus is a terminal device, a receive end apparatus is a network device, the terminal apparatus determines CSI of an uplink channel and P antenna port groups of the terminal apparatus, and P is a positive integer; the terminal device determines V OAM mode groups based on the CSI of the uplink channel and first OAM modes, where the first OAM modes are OAM modes supported by both the terminal device and the network device, and V is a positive integer less than or equal to P; the terminal device determines a first precoding matrix based on the P antenna port groups and the V OAM mode groups, where the first precoding matrix includes P*V second precoding matrices; the terminal device precodes reference signals by using a $1^{st}$ to a $K^{th}$ columns in the first precoding matrix, to obtain first reference signals, and sends the first reference signals to the network apparatus; the terminal apparatus receives second indication information from the network apparatus, where the second indication information is used to indicate a second reference signal, and the second reference signal is some or all reference signals in the first reference signals; and the terminal apparatus determines a fourth precoding matrix based on the second indication information, where the fourth precoding matrix is used to precode first data Based on this solution, OAM modes may be introduced into a precoding matrix, so that OAM is integrated into a precoding process of conventional MIMO, thereby improving performance of the conventional MIMO by using the OAM in MIMO communication, and further improving spectral efficiency.

With reference to the first aspect, the second aspect, and the third aspect, in a possible design, a correspondence exists between the second precoding matrix and an element in a third precoding matrix, and the third precoding matrix is a matrix of P rows and V columns.

With reference to the first aspect, the second aspect, and the third aspect, in a possible design, that a correspondence exists between the second precoding matrix and an element in a third precoding matrix includes: the second precoding matrix corresponds to an element in an $i^{th}$ row and a $j^{th}$ column in the third precoding matrix, where the second precoding matrix is one of the P*V second precoding matrices, the second precoding matrix is a matrix of M rows and N columns, M is a quantity of antenna ports included in an $i^{th}$ antenna port group in the P antenna port groups, N is a quantity of OAM modes included in a $j^{th}$ OAM mode group in the V OAM mode groups, M is a positive integer greater than 1, N is a positive integer less than or equal to M, i is a positive integer less than or equal to P, and j is a positive integer less than or equal to V.

With reference to the first aspect, the second aspect, and the third aspect, in a possible design, that the second precoding matrix corresponds to an element in an $i^{th}$ row and a $j^{th}$ column in the third precoding matrix includes: a location of the second precoding matrix in the first precoding matrix is the same as a location of the element in the $i^{th}$ row and the $j^{th}$ column in the third precoding matrix:

With reference to the first aspect and the second aspect, in a possible design, the foregoing first indication information includes: a quantity of the V OAM mode groups, an identifier of the third precoding matrix, a quantity of OAM modes included in each of the V OAM mode groups, and an identifier of each OAM mode group.

With reference to the first aspect, the second aspect, and the third aspect, in a possible design, if the element in the row and the $j^{th}$ column in the third precoding matrix that corresponds to the second precoding matrix is 0, all elements in the second precoding matrix are 0; or if the element in the $i^{th}$ row and the $j^{th}$ column is not 0, an element in an $x^{th}$ row and a $y^{th}$ column in the second precoding matrix is a product of a first value and the element in the $i^{th}$ row and the $j^{th}$ column, and the first value is determined by an azimuth of an array element, corresponding to an $x^{th}$ antenna port in the $i^{th}$ antenna port group, relative to a first array center and a $y^{th}$ OAM mode in the $j^{th}$ OAM mode group, where the first array center is an array center of an antenna array corresponding to the $i^{th}$ antenna port group in an antenna array of the transmit end apparatus, x is a positive integer less than or equal to M, and y is a positive integer less than or equal to N.

According to a fourth aspect, a communications apparatus is provided, to implement the foregoing methods. The communications apparatus may be the receive end apparatus in the first aspect, an apparatus including the receive end apparatus, or an apparatus included in the receive end apparatus, such as a chip. Alternatively, the communications apparatus may be the transmit end apparatus in the second aspect or the third aspect, an apparatus including the transmit end apparatus, or an apparatus included in the transmit end apparatus. The communications apparatus includes a corresponding module, unit, or means (means) for implementing the methods. The module, unit, or means may be implemented by hardware or software, or by corresponding software executed by hardware. The hardware or the software includes one or more modules or units corresponding to the functions.

According to a fifth aspect, a communications apparatus is provided, including a processor and a memory. The memory is configured to store computer instructions, and when the processor executes the instructions, the communications apparatus is enabled to perform the method according to any one of the foregoing aspects. The communications apparatus may be the receive end apparatus in the first aspect, an apparatus including the receive end apparatus, or an apparatus included in the receive end apparatus, such as a chip. Alternatively, the communications apparatus may be the transmit end apparatus in the second aspect or the third aspect, an apparatus including the transmit end apparatus, or an apparatus included in the transmit end apparatus.

According to a sixth aspect, a communications apparatus is provided, including a processor and an interface circuit. The interface circuit may be a code/data read/write interface circuit, and the interface circuit is configured to receive computer-executable instructions (where the computer-executable instructions are stored in a memory, and may be directly read from the memory or through another component), and transmit the computer-executable instructions to the processor. The processor is configured to run the computer-executable instructions to perform the method according to any one of the foregoing aspects.

According to a seventh aspect, a communications apparatus is provided, including a processor, where the processor is configured to: after being coupled to a memory and reading instructions in the memory, perform the method in any one of the foregoing aspects according to the instructions. The communications apparatus may be the receive end apparatus in the first aspect, an apparatus including the receive end apparatus, or an apparatus included in the receive end, apparatus, such as a chip. Alternatively, the communications apparatus may be the transmit end apparatus in the second aspect or the third aspect, an apparatus including the transmit end apparatus, or an apparatus included in the transmit end apparatus.

According to an eighth aspect, a computer-readable storage medium is provided. The computer-readable storage medium stores instructions. When the instructions are run on a communications apparatus, the communications apparatus is enabled to perform the method according to any one of the foregoing aspects. The communications apparatus may be the receive end apparatus in the first aspect, an apparatus including the receive end apparatus, or an apparatus included in the receive end apparatus, such as a chip. Alternatively, the communications apparatus may be the transmit end apparatus in the second aspect or the third aspect, an apparatus including the transmit end apparatus, or an apparatus included in the transmit end apparatus.

According to a ninth aspect, a computer program product including instructions is provided. When the computer program product runs on a communications apparatus, the communications apparatus is enabled to perform the method according to any one of the foregoing aspects. The communications apparatus may be the receive end apparatus in the first aspect, an apparatus including the receive end apparatus, or an apparatus included in the receive end apparatus, such as a chip. Alternatively, the communications apparatus may be the transmit end apparatus in the second aspect or the third aspect, an apparatus including the transmit end apparatus, or an apparatus included in the transmit end apparatus.

According to a tenth aspect, a communications apparatus (for example, the communications apparatus may be a chip or a chip system) is provided. The communications apparatus includes a processor, where the processor is configured to implement a function in any one of the foregoing aspects. In a possible design, the communications apparatus further includes a memory. The memory is configured to store necessary program instructions and data. When the communications apparatus is the chip system, the communications apparatus may include a chip, or may include a chip and another discrete component.

For a technical effect brought by any design manner in the fourth aspect to the tenth aspect, refer to technical effects brought by different design manners in the first aspect, the second aspect, or the third aspect. Details are not described herein again.

According to an eleventh aspect, a communications system is provided. The communications system includes the receive end apparatus according to the foregoing aspects and the transmit end apparatus according to the foregoing aspects.

DESCRIPTION OF EMBODIMENTS

Figure 1A:
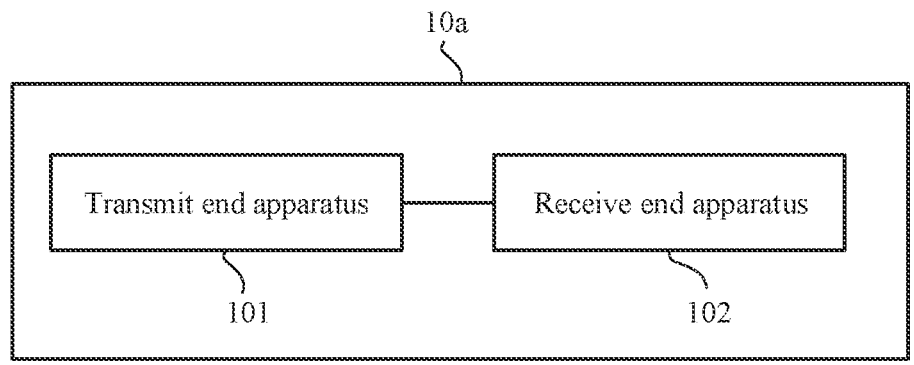
FIG. 1A is a schematic diagram of a structure of a communications system according to an embodiment of this application.

For ease of understanding the technical solutions in the embodiments of this application, the following first briefly describes technologies or terms related to this application.

1. Channel Quality Obtaining Manner

For downlink transmission, a network device first sends a channel state information-reference signal (channel state information-reference signal, CSI-RS) to a terminal device. The terminal device performs channel measurement based on the CSI-RS to obtain channel state information (channel state information, CSI) of a downlink channel, and sends a CSI report to the network device. The CSI report may include, for example, a channel quality indicator (channel quality indicator, CQI), a rank indicator (rank indicator, RI), and a precoding matrix indicator (precoding matrix indicator, PMI). After receiving the CSI report reported by the terminal device, the network device completes mapping from a transport layer to an antenna port by using a precoding matrix indicated by the PMI in the CSI report or another precoding matrix determined, based on the CSI report. Both sending of the CSI-RS and reporting of the CSI report may be periodic, semi-persistent, or aperiodic.

For uplink transmission, a terminal device may obtain quality of an uplink channel in the following two manners: In one manner, the terminal device sends a sounding reference signal (sounding reference signal, SRS) to a network device. The network device performs measurement based on the SRS to obtain CSI of the uplink channel, and indicates a suitable uplink transmission rank and a suitable precoding matrix to the terminal device. The other manner may be applied to a scenario in which a channel environment has channel reciprocity between uplink and downlink: The terminal device may perform measurement based on a CSI-RS sent by a network device to obtain CSI of a downlink channel, and then selects an uplink precoding matrix which is considered optimal by the terminal device, and sends an SRS to the network device on each precoding beam corresponding to the uplink precoding matrix. The network device determines, based on quality of the received SRS, an uplink precoding matrix finally used by the terminal device, and uses an SRS resource indicator (SRS resource indicator, SRI) to indicate, to the terminal device, the uplink precoding matrix that is determined by the network device and that is finally used by the terminal device.

2. Orbital Angular Momentum (Orbital Angular Momentum, OAM)

The orbital angular momentum represents rotation of electrons around an axis of propagation, and is generated by rotation of an energy flow (described by a Poynting vector) around an optical axis. The OAM causes a phase wavefront of an electromagnetic wave to be in a spiral shape. To be specific, the wavefront of the electromagnetic wave carrying the OAM is no longer a planar structure, but rotates around a beam propagation direction, and therefore presents a spiral phase structure. In addition, a quantity of phase rotations of an electromagnetic wave having OAM is referred to as an OAM mode (or referred to as an OAM mode), and different OAM modes are orthogonal to each other.

The following describes the technical solutions in the embodiments of this application with reference to the accompanying drawings in the embodiments of this application. In the descriptions of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, in the descriptions of this application, "a plurality of" means two or more than two unless otherwise specified. "At least one of the following items (pieces)" or a similar expression thereof means any combination of these items, including any combination of singular item (piece) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in the embodiments of this application, in the embodiments of this application, terms such as "first" and "second" are used to distinguish between same items or similar items whose functions and purposes are basically the same. A person skilled in the art may understand that the terms such as "first" and "second" do not limit a quantity and an execution sequence, and the terms such as "first" and "second" do not indicate a definite difference. In addition, in the embodiments of this application, a word such as "example" or "for example" is used to represent giving an example, an illustration, or a description. Any embodiment or design scheme described as an "example" or "for example" in the embodiments of this application should not be explained as being more preferred or having more advantageous than another embodiment or design scheme. Exactly, use of the word such as "example" or "for example" is intended to present a relative concept in a specific manner for ease of understanding.

The technical solutions in the embodiments of this application may be applied to various communications systems, such as an orthogonal frequency division multiple access (orthogonal frequency division multiple access, OFDMA) system, a single carrier frequency division multiple access (single carrier FDMA, SC-FDMA) system, an NTN system and other systems. The terms "system" and "network" can be interchanged with each other. The OFDMA system may implement wireless technologies such as evolved universal terrestrial radio access (evolved universal terrestrial radio access, E-UTRA) and ultra mobile broadband (ultra mobile broadband, UMB). The E-UTRA is an evolved release of a universal mobile telecommunications system (universal mobile telecommunications system, UNITS). The 3rd generation partnership project (3rd generation partnership project, 3GPP) uses a new release of the E-UTRA in long term evolution (long term evolution, LTE) and various releases evolved based on the LTE. A 5G communications system is a next-generation communications system under research. The 5G communications system includes a non-standalone (non-standalone, NSA) 5G mobile communications system, a standalone (standalone, SA) 5G mobile communications system, or both an NSA 5G mobile communications system and an SA 5G mobile communications system. In addition, the communications systems are also applicable to a future-oriented communications technology, and are applicable to the technical solutions provided in the embodiments of this application. The foregoing communications systems applicable to this application are merely examples for description, and communications systems applicable to this application are not limited thereto. A general description is provided herein, and details are not described below again.

FIG. 1A shows a precoding matrix determining system 10a according to an embodiment of this application. The communications system 10a includes a transmit end apparatus 101 and a receive end apparatus 102. The transmit end apparatus 101 may be a network device, or may be a terminal device. The receive end apparatus 102 may be a terminal device, or may be a network device. The transmit end apparatus 101 and the receive end apparatus 102 are different types of devices. For example, the transmit end apparatus 101 is a network device, and the receive end apparatus 102 is a terminal device.

Interaction between the transmit end apparatus 101 and the receive end apparatus 102 shoe in FIG. 1A is used as an example. In this embodiment of this application, the receive end apparatus obtains CST of a first channel and information about P antenna port groups of the transmit end apparatus, and determines V OAM mode groups based on the CSI of the first channel and first OAM modes, where the first OAM modes are OAM modes supported by both the transmit end apparatus and the receive end apparatus. Further, the receive end apparatus determines a first precoding matrix based on the P antenna port groups and the V OAM mode groups, where the first precoding matrix includes P*V second precoding matrices, and sends first indication information to the transmit end apparatus, where the first indication information indicates the first precoding matrix. The first precoding matrix is used to precode first data, where P is a positive integer, and V is a positive integer less than or equal to P. Correspondingly, the transmit end apparatus receives the first indication information from the receive end apparatus, and determines the first precoding matrix based on the first indication information. Based on this solution, OAM modes may be introduced into a precoding matrix, and further a precoding problem in integrating MIMO and OAM into communication is resolved, thereby improving performance of conventional MIMO by using the OAM in MIMO communication, and further improving spectral efficiency.

Figure 1B:
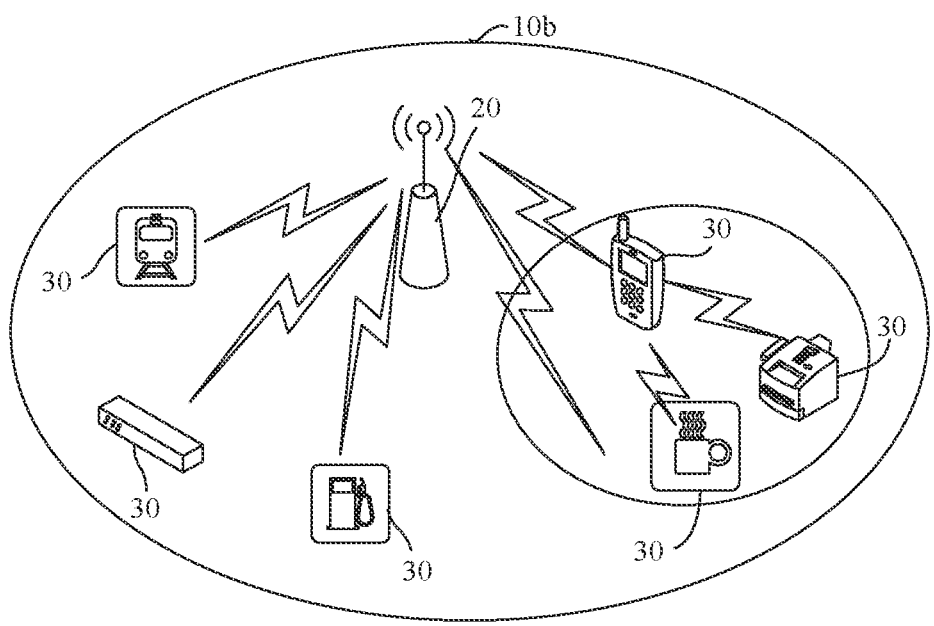
FIG. 1B is a schematic diagram of a structure of another communications system according to an embodiment of this application.

FIG. 1B shows another precoding matrix determining system 10b according to an embodiment of this application. The precoding matrix determining system 10b includes a network device 20 and one or more terminal devices 30 connected to the network device 20. Optionally, different terminal devices 30 may communicate with each other. The network device 20 may serve as the transmit end apparatus 101 in FIG. 1A. In this case, the one or more terminal devices 30 each serve as the receive end apparatus 102 in FIG. 1A. Alternatively, the network device 20 may serve as the receive end apparatus 102 in FIG. 1A. In this case, the one or more terminal devices 30 each serve as the sending device 101 in FIG. 1A.

Optionally, the network device 20 in this embodiment of this application is a device for connecting the terminal device 30 to a wireless network. The network device 20 may be a node in a radio access network, and may also be referred to as a base station, or a radio access network (radio access network, RAN) node (or device). For example, the network device may include an evolved NodeB (NodeB, eNB, or eNodeB, evolved NodeB) in a long term evolution (long term evolution, LTE) system or an evolved LTE (LTE-Advanced, LTE-A) system, for example, a conventional macro base station eNB and a micro base station eNB in a heterogeneous network scenario; or may include a next generation NodeB (next generation NodeB, gNB) in a 5G new radio (new radio, NR) system; or may include a transmission reception point (transmission reception point, TRP), a home base station (for example, a home evolved NodeB, or a home NodeE, HNB), a baseband unit (baseband unit, BBU), a baseband pool BBU pool, a Wi-Fi access point (access point, AP), or the like; or may include a centralized unit (centralized unit, CU) and a distributed unit (distributed unit, DU) in a cloud access network (cloud radio access network, CloudRAN) system. This is not limited in the embodiments of this application.

Optionally, the terminal device 30 in this embodiment of this application may be a device configured to implement a wireless communication function, for example, a terminal or a chip that may be used in a terminal. The terminal may be user equipment (user equipment, UE), an access terminal, a terminal unit, a terminal station, a mobile station, a mobile console, a remote station, a remote terminal, a mobile device, a wireless communications device, a terminal agent, a terminal apparatus, or the like in a 5G network or a future evolved PLMN. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. The terminal may be movable or fixed.

Figure 2A:
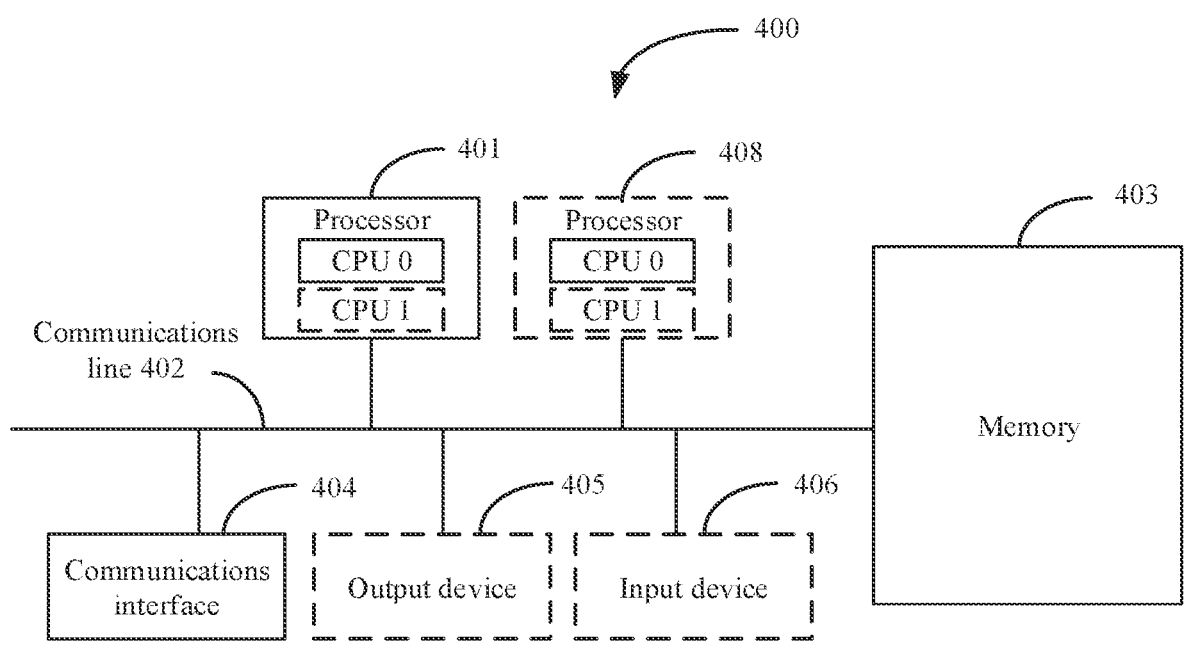
FIG. 2A is a schematic diagram of a structure of a communications device according to an embodiment of this application.

In a possible implementation, the transmit end apparatus 101 and the receive end apparatus 102 may be implemented by using a communications device in FIG. 2A. FIG. 2A is a schematic diagram of a structure of hardware of the communications device according to an embodiment of this application. The communications device 400 includes a processor 401, a communications line 402, a memory 403, and at least one communications interface (FIG. 2A is described by using merely an example in which the communications device 400 includes a communications interface 404). The processor 401 may be a general-purpose central processing unit (central processing unit, CPU), a microprocessor, an application-specific integrated circuit (application-specific integrated circuit, ASIC), or one or more integrated circuits configured to control program execution of the solutions in this application.

The communications line 402 may include a path for transmitting information between the foregoing components.

The communications interface 404 uses any transceiver-type apparatus, and is configured to communicate with another device or a communications network such as the Ethernet, a radio access network (radio access network, RAN), or a wireless local area network (wireless local area networks, WLAN).

The memory 403 may be a read-only memory (read-only memory, ROM) or another type of static storage device that can store static information and instructions, or a random access memory (random access memory, RAM) or another type of dynamic storage device that can store information and instructions. The memory may alternatively be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory 403 is not limited thereto. The memory may exist independently, and is connected to the processor through the communications line 402. The memory may alternatively be integrated with the processor.

The memory 403 is configured to store computer-executable instructions for executing the solutions of this application, and the processor 401 controls the execution. The processor 401 is configured to execute the computer-executable instructions stored in the memory 403, to implement a preceding matrix determining method provided in the following embodiments of this application.

Optionally, the computer-executable instructions in the embodiments of this application may also be referred to as application program code. This is not specifically limited in the embodiments of this application.

In a specific implementation, in an embodiment, the processor 401 may include one or more CPUs, for example, a CPU 0 and a CPU 1 in FIG. 2A.

In a specific implementation, in an embodiment, the communications device 400 may include a plurality of processors, for example, the processor 401 and a processor 408 in FIG. 2A. Each of the processors may be a single-core (single-CPU) processor, or may be a multi-core (multi-CPU) processor. The processor herein may be one or more devices, circuits, and/or processing cores configured to process data (for example, computer program instructions).

In a specific implementation, in an embodiment, the communications device 400 may further include an output device 405 and an input device 406. The output device 405 communicates with the processor 401, and may display information in a plurality of manners. For example, the output device 405 may be a liquid crystal display (liquid crystal display, LCD), a light emitting diode (light emitting diode, LED) display device, a cathode ray tube (cathode ray tube, CRT) display device, or a projector (projector). The input device 406 communicates with the processor 401, and may receive an input of a user in a plurality of manners. For example, the input device 406 may be a mouse, a keyboard, a touchscreen device, or a sensing device.

The communications device 400 may be a general-purpose device or a dedicated device. In a specific implementation, the communications device 400 may be a desktop computer, a portable computer, a network server, a palmtop computer (personal digital assistant, PDA), a mobile phone, a tablet computer, a wireless terminal device, an embedded device, or a device with a structure similar to the structure in FIG. 2A. A type of the communications device 400 is not limited in this embodiment of this application.

In another possible implementation, that the network device 20 may serve as the transmit end apparatus 101 in FIG. 1A, and the one or more terminal devices 30 each may serve as the receive end apparatus 102 in FIG. 1A is used as an example. Alternatively, that the network device 20 may serve as the receive end apparatus 102 in FIG. 1A, and the one or more terminal devices 30 each may serve as the transmit end apparatus 101 in FIG. 1A is used as an example. Optionally, this embodiment of this application further provides a schematic diagram of structures of the network device 20 and the terminal device 30. Optionally, FIG. 2B is a schematic diagram of structures of the network device 20 and the terminal device 30 according to this embodiment of this application.

Figure 2B:
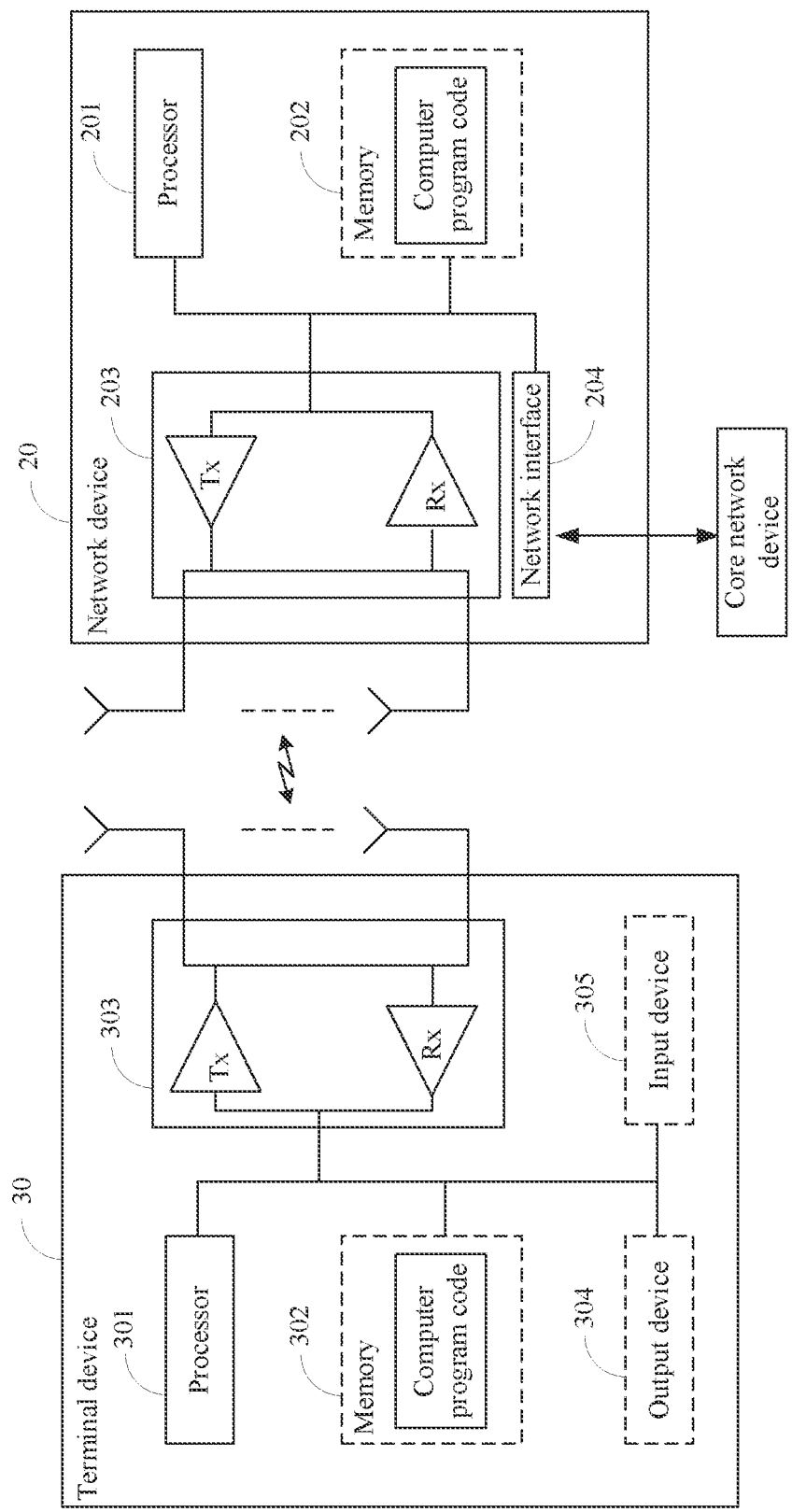
FIG. 2B is a schematic diagram of structures of a terminal device and a network device according to an embodiment of this application.

The terminal device 30 includes at least one processor (an example in which the terminal device 30 includes one processor 301 is used for description in FIG. 2B) and at least one transceiver (an example in which the terminal device 30 includes one transceiver 303 is used for description in FIG. 2B). Optionally, the terminal device 30 may further include at least one memory (an example in which the terminal device 30 includes one memory 302 is used for description in FIG. 2B), at least one output device (an example in which the terminal device 30 includes one output device 304 is used for description in FIG. 2B), and at least one input device (an example in which the terminal device 30 includes one input device 305 is used for description in FIG. 2B).

The processor 301, the memory 302, and the transceiver 303 are connected through a communications line. The communications line may include a path for transmitting information between the foregoing components.

The processor 301 may be a general-purpose central processing unit (central processing unit, CPU), a microprocessor, an application-specific integrated circuit (application-specific integrated circuit, ASIC), or one or more integrated circuits configured to control program execution of the solutions in this application. In a specific implementation, in an embodiment, the processor 301 may alternatively include a plurality of CPUs, and the processor 301 may be a single-core (single-CPU) processor or a multi-core (multi-CPU) processor. The processor herein may be one or more devices, circuits, or processing cores configured to process data (for example, computer program instructions).

The memory 302 may be an apparatus having a storage function. The memory 302 may be a read-only memory (read-only memory, ROM) or another type of static storage device that can store static information and instructions, or a random access memo an d om access memory, RAM) or another type of dynamic storage device that can store information and instructions. The memory 302 may alternatively be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory 302 is not limited thereto. The memory 302 may exist independently, and is connected to the processor 301 through the communications line. The memory 302 may alternatively be integrated with the processor 301.

The memory 302 is configured to store computer-executable instructions for executing the solutions of this application, and the processor 301 controls the execution. Specifically, the processor 301 is configured to execute the computer-executable instructions stored in the memory 302, to implement the precoding matrix determining method in this embodiment of this application.

Alternatively, optionally, in this embodiment of this application, the processor 301 may perform related processing functions in the precoding matrix determining method provided in the following embodiments of this application. The transceiver 303 is responsible for communicating with another device or a communications network. This is not specifically limited in this embodiment of this application.

Optionally, the computer-executable instructions in this embodiment of this application may also be referred to as application program code or computer program code. This is not specifically limited in this embodiment of this application.

The transceiver 303 may use any transceiver-type apparatus, and is configured to communicate with another device or a communications network such as the Ethernet, a radio access network (radio access network, RAN), or a wireless local area network (wireless local area networks, WLAN). The transceiver 303 includes a transmitter (transmitter, Tx) and a receiver (receiver, Rx).

The output device 304 communicates with the processor 301, and may display information in a plurality of manners. For example, the output device 304 may be a liquid crystal display (liquid crystal display. LCD), a light emitting diode (light emitting diode, LED) display device, a cathode ray tube (cathode ray tube, CRT) display device, or a projector (projector).

The input device 305 communicates with the processor 301, and may receive an input of a user in a plurality of manners. For example, the input device 305 may be a mouse, a keyboard, a touchscreen device, or a sensing device.

The network device 20 includes at least one processor (an example in which the network device 20 includes one processor 201 is used for description in FIG. 2B), at least one transceiver (an example in which the network device 20 includes one transceiver 203 is used for description in FIG. 2B), and at least one network interface (an example in which the network device 20 includes one network interface 204 is used for description in FIG. 2B). Optionally, the network device 20 may further include at least one memory (an example in which the network device 20 includes one memory 202 is used for description in FIG. 2B). The processor 201, the memory 202, the transceiver 203, and the network interface 204 are connected through a communications line. The network interface 204 is configured to connect to a core network device through a link (such as an S1 interface), or connect to a network interface of another network device through a wired or wireless link (such as an X2 interface) (where the connection is not shown in FIG. 2B). This is not specifically limited in this embodiment of this application. In addition, for related descriptions of the processor 201, the memory 202, and the transceiver 203, refer to the descriptions of the processor 301, the memory 302, and the transceiver 303 in the terminal device 30. Details are not described herein again.

Figure 3:
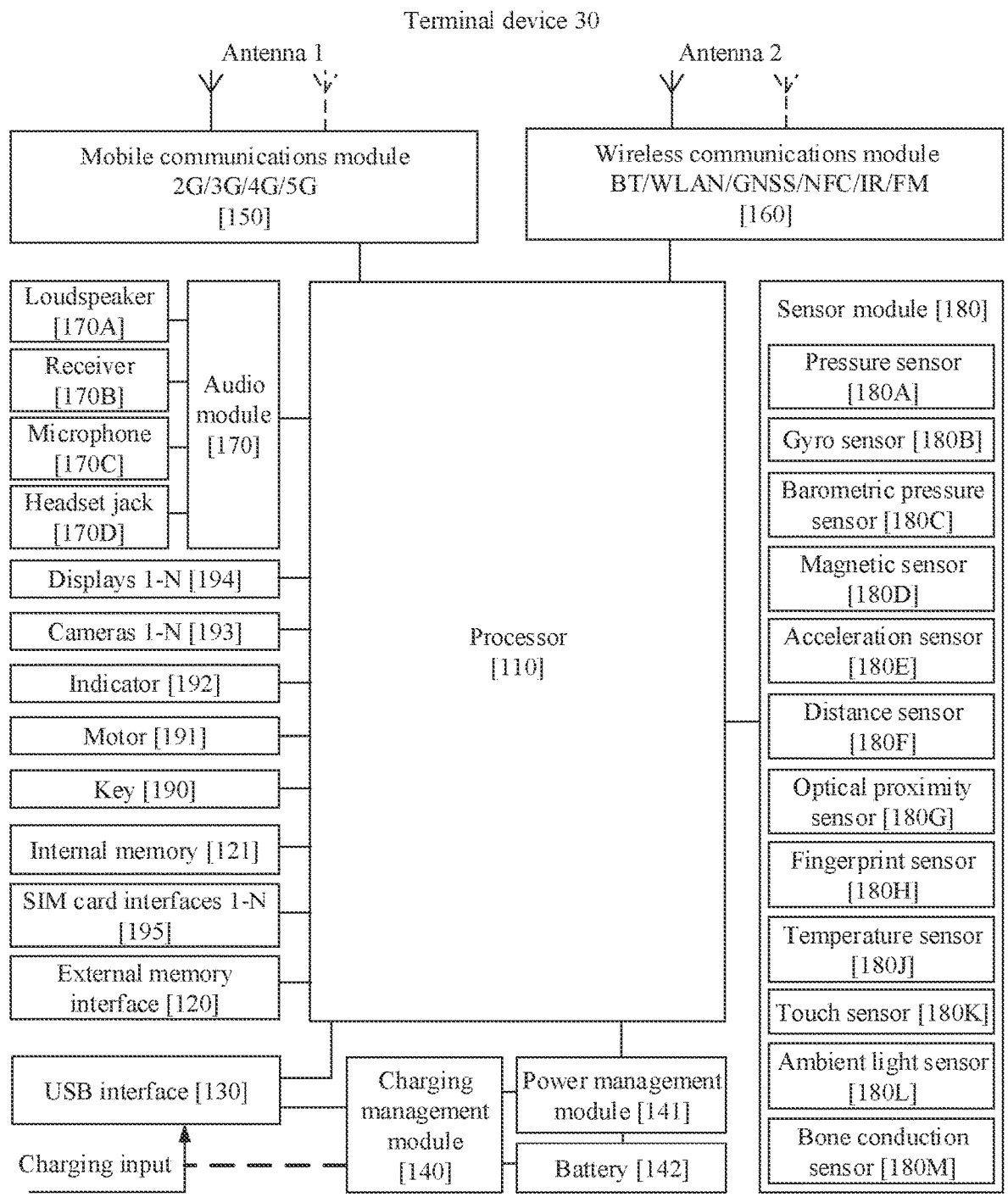
FIG. 3 is a schematic diagram of a structure of another terminal device according to an embodiment of this application.

With reference to the schematic diagram of the structure of the terminal device 30 shown in FIG. 2B, for example, FIG. 3 shows a specific structural form of the terminal device 30 according to an embodiment of this application.

In some embodiments, a function of the processor 301 in FIG. 2B may be implemented by a processor 110 in FIG. 3.

In some embodiments, a function of the transceiver 303 in FIG. 2B may be implemented by an antenna 1, an antenna 2, a mobile communications module 150, a wireless communications module 160, and the like in FIG. 3.

The antenna 1 and the antenna 2 are configured to transmit and receive an electromagnetic wave signal. Each antenna in the terminal device 30 may be configured to cover one or more communication frequency bands. Different antennas may be further multiplexed, to increase antenna utilization. For example, the antenna 1 may be multiplexed as a diversity antenna, in a wireless local area network. In some other embodiments, the antenna may be used in combination with a tuning switch.

The mobile communications module 150 may provide a solution that is applied to the terminal device 30 and that is used for wireless communication that includes 2G/3G/4G/5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to a modem processor for demodulation. The mobile communications module 150 may further amplify a signal modulated by the modem processor, and convert the signal into an electromagnetic wave by using the antenna 1 for radiation. In some embodiments, at least some functional modules of the mobile communications module

150 may be disposed in the processor 110. In some embodiments, at least some functional modules of the mobile communications module 150 and at least some modules of the processor 110 may be disposed in a same device.

The wireless communications module 160 may provide a solution that is applied to the terminal device 30 and that is used for wireless communication such as a wireless local area network (wireless local area network, WLAN) (for example, a Wi-Fi network), Bluetooth (blue tooth, BT), a global navigation satellite system (global navigation satellite system, GNSS), frequency modulation (frequency modulation, FM), near field communication (near field communication, NFC) technology, or an infrared (infrared, IR) technology. The wireless communications module 160 may be one or more components integrating at least one communication processing nodule. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave by using the antenna 2 for radiation. When the terminal device 30 is a first device, that the wireless communications module 160 may provide a solution used for NFC wireless communication on the terminal device 30 means that the first device includes an NFC chip. The NFC chip can improve an NIT wireless communication function. When the terminal device 30 is a second device, that the wireless communications module 160 may provide a solution used for NFC wireless communication on the terminal device 30 means that the first device includes an electronic label (such as a radio frequency identification (radio frequency identification, RFID) label). When approaching the electronic label, an NFC chip of another device can perform NFC wireless communication with the second device.

In some embodiments, the antenna 1 of the terminal device 30 is coupled to the mobile communications module 150, and the antenna 2 of the terminal device 30 is coupled to the wireless communications module 160, so that the terminal device 30 can communicate with a network and another device by using a wireless communications technology. The wireless communications technology may include a global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), GNSS, WLAN, NFC, FM, or IR technology, or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), or a satellite based augmentation system (satellite based augmentation system, SBAS).

In some embodiments, a function of the memory 302 in FIG. 2B may be implemented by an internal memory 121 in FIG. 3, an external memory (such as a micro SD card) connected to an external memory interface 120 in FIG. 3, or the like.

In some embodiments, a function of the output device 304 in FIG. 2B may be implemented by a display screen 194 in FIG. 3. The display screen 194 is configured to display an image, a video, and the like. The display 194 includes a display panel.

In some embodiments, a function of the input device 305 in FIG. 2B may be implemented by a mouse, a keyboard, a touchscreen device, or a sensor module 180 in FIG. 3. For example, as shown in FIG. 3, the sensor module 180 may include one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M. This is not specifically limited in this embodiment of this application.

In some embodiments, as shown in FIG. 3, the terminal device 30 may further include one or more of an audio module 170, a camera 193, an indicator 192, a motor 191, a key 190, an SIM card interface 195, a USB interface 130, a charging management module 140, a power management module 141, and a battery 142. The audio module 170 may be connected to a speaker 170A (also referred to as a "loudspeaker"), a telephone receiver 170B (also referred to as a "handset"), a microphone 170C (also referred to as a "mic" or "mike"), an earphone jack 170D, or the like. This is not specifically limited in this embodiment of this application.

It may be understood that the structure shown in FIG. 3 does not constitute a specific limitation on the terminal device 30. For example, in some other embodiments of this application, the terminal device 30 may include more or fewer components than those shown in the figure, or some components may be combined, or some components may be split, or the components may be differently arranged. The components shown in the figure may be implemented by using hardware, software, or a combination of software and hardware.

With reference to FIG. 1A to FIG. 3, the interaction between the transmit end device 101 and the receive end device 102 shown in FIG. 1A is used as an example to describe the precoding matrix determining method provided in this embodiment of this application.

It should be noted that, in the following embodiments of this application, names of messages between network elements, names of parameters in messages, or the like are merely examples, and there may be other names in a specific implementation. This is not specifically limited in the embodiments of this application.

Figure 4:
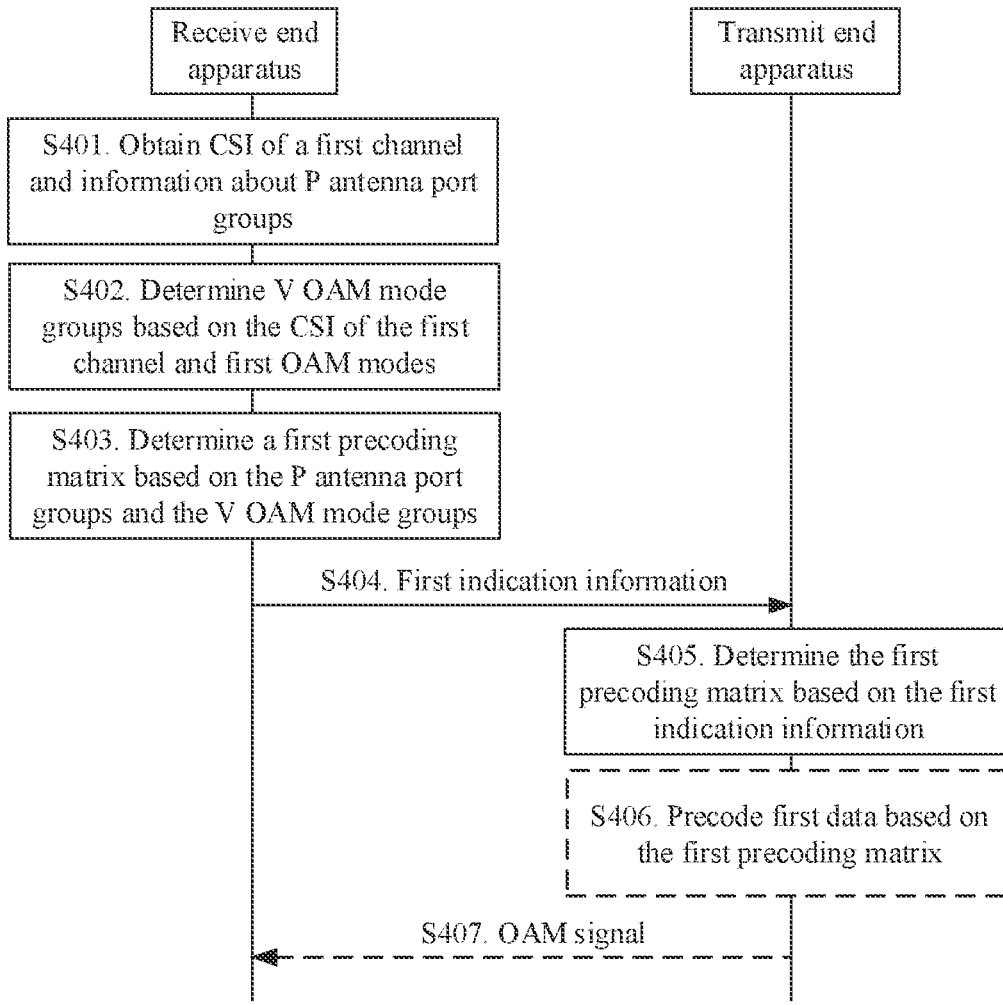
FIG. 4 is a schematic flowchart of a precoding matrix determining method according to an embodiment of this application.

FIG. 4 shows a precoding matrix determining method according to an embodiment of this application. The precoding matrix determining method includes the following steps.

S401. A receive end apparatus obtains CSI of a first channel and information about P antenna port groups of a transmit end apparatus.

The first channel is a physical channel used by the transmit end apparatus to send data to the receive end apparatus.

Optionally, the transmit end apparatus may send a reference signal to the receive end apparatus. After receiving the reference signal from the transmit end apparatus, the receive end apparatus performs channel measurement based on the reference signal to obtain the CSI of the first channel.

The information about the P antenna port groups of the transmit end apparatus is used to indicate a quantity P of antenna port groups of the transmit end apparatus and antenna ports included in each of the P antenna port groups, and P is a positive integer.

it should be noted that, a quantity of the antenna ports included in each of the P antenna port groups is greater than 1, that is, the quantity of antenna port groups of the transmit end apparatus is less than a total quantity of antenna ports of the transmit end apparatus.

Optionally, the transmit end apparatus may determine the P antenna port groups of the transmit end apparatus based on information about an antenna array of the transmit end apparatus. In other words, the transmit end apparatus may determine, based on the information about the antenna array of the transmit end apparatus, antenna ports for sending reference signals, group the antenna ports into P groups, and send the information about the P antenna port groups to the receive end apparatus.

Optionally, the information about the antenna array of the transmit end apparatus may be a shape, a quantity, a connection manner, and the like of the antenna array of the transmit end apparatus. This is not specifically limited in this embodiment of this application.

Optionally, the transmit end apparatus may send the information about the P antenna port groups to the transmit end apparatus in different manners. In a possible implementation, the transmit end apparatus may explicitly send the information about the P antenna port groups to the terminal device, that is, send the information about the P antenna port groups by using dedicated signaling, a dedicated information cell, or a dedicated message. For example, the information about the P antenna port groups may include {antenna port group 1: antenna port 1, antenna port 2; antenna port group 2: antenna port 3, antenna port 4}, that is, indicates that the four antenna ports of the transmit end apparatus may be divided into two groups, and a grouping situation is as follows: antenna port group 1 includes two antenna ports: antenna port 1 and antenna port 2, and antenna port group 2 includes two antenna ports: antenna port 3 and antenna port 4. Correspondingly, the receive end apparatus obtains the information about the P antenna port groups of the transmit end apparatus, that is: the receive end apparatus receives the information about the P antenna port groups of the transmit end apparatus from the transmit end apparatus.

In another possible implementation, the transmit end apparatus may implicitly send indication information of the P antenna port groups to the terminal device, for example, send different reference signals to the receive end apparatus by using different antenna port groups. Correspondingly, when receiving the reference signals from the transmit end apparatus, the receive end apparatus may obtain the information about the P antenna port groups based on the reference signals, to determine the quantity of antenna port groups of the transmit end apparatus and the antenna ports included in each antenna port group.

S402. The receive end apparatus determines V OAM mode groups based on the CSI of the first channel and first OAM modes.

The first OAM modes are OAM modes supported by both the transmit end apparatus and the receive end apparatus, and V is a positive integer less than or equal to P.

Optionally, the transmit end apparatus may send its supported OAM modes to the receive end apparatus, so that the receive end apparatus determines the V OAM mode groups. It may be understood that, before the transmit end apparatus sends its supported OAM modes to the receive end apparatus, the receive end apparatus may request, from the transmit end apparatus, the OAM modes supported by the transmit end apparatus.

For example, Table 1 lists all possible forms of the OAM mode groups when the first OAM modes provided in this embodiment of this application are [−1, −2, 0, 1, 2], the quantity V of the OAM mode groups is equal to 2, and quantities of OAM modes included in the 2 OAM mode groups are 2 and 3, respectively.

TABLE 1

| Quantity of OAM modes in an OAM mode group | Identifiers of OAM mode groups | OAM mode groups (corresponding values of the identifiers successively increase from left to right) | | | | |
|---|---|---|---|---|---|---|
| 2 | 0-4 | [0, 1] | [0, −1] | [0, 2] | [0, −2] | [1, −1] |
|   | 5-9 | [1, 2] | [1, −2] | [−1, 2] | [−1, −2] | [2, −2] |
| 3 | 0-4 | [0, 1, −1] | [0, 1, 2] | [0, 1, −2] | [0, −1, 2] | [0, −1, −2] |
|   | 5-9 | [0, 2, −2] | [1, −1, 2] | [1, −1, −2] | [1, 2, −2] | [−1, 2, −2] |

When an OAM mode group includes a specific quantity of OAM modes, a quantity of all possible OAM mode groups meet the following formula (1):

$$C_n^m = \frac{n!}{m!(n-m)!}, \text{where} \quad (1)$$

n represents a quantity of OAM modes included in the first OAM modes, and m represents the quantity of OAM modes included in the OAM mode group. For example, when the quantity of OAM modes included in the OAM mode group is 2, the quantity of all possible OAM mode groups is $$C_5^2 = \frac{5!}{1!(5-2)!} = 10.$$

S403. The receive end apparatus determines a first precoding matrix based on the P antenna port groups and the V OAM mode groups.

The first precoding matrix includes P*V second precoding matrices, and a second precoding matrix may represent an OAM mode-based coding scheme of antenna ports included in one antenna port group.

Optionally, a correspondence exists between the second precoding matrix and an element in a third precoding matrix. The third precoding matrix represents an inter-group coding scheme of the P antenna port groups, the third precoding matrix is a matrix of P rows and V columns, each row corresponds to one antenna port group, and each column corresponds to one OAM mode group.

For example, Table 2 lists possible forms of the third precoding matrix when the quantity of antenna port groups provided in this embodiment of this application is 2.

TABLE 2

| Quantity of OAM mode groups | Identifiers of third precoding matrices | Third precoding matrices (corresponding values of the identifiers successively increase from left to right) |
|---|---|---|
| 1 | 0-5 | $\frac{1}{\sqrt{2}}\begin{bmatrix}1\\0\end{bmatrix}$  $\frac{1}{\sqrt{2}}\begin{bmatrix}0\\1\end{bmatrix}$  $\frac{1}{\sqrt{2}}\begin{bmatrix}1\\1\end{bmatrix}$  $\frac{1}{\sqrt{2}}\begin{bmatrix}1\\-1\end{bmatrix}$  $\frac{1}{\sqrt{2}}\begin{bmatrix}1\\j\end{bmatrix}$  $\frac{1}{\sqrt{2}}\begin{bmatrix}1\\-j\end{bmatrix}$ |
| 2 | 0-2 | $\frac{1}{\sqrt{2}}\begin{bmatrix}1 & 0\\0 & 1\end{bmatrix}$  $\frac{1}{2}\begin{bmatrix}1 & 1\\1 & -1\end{bmatrix}$  $\frac{1}{2}\begin{bmatrix}1 & 1\\j & -j\end{bmatrix}$ |

It should be noted that, in this embodiment of this application, the quantity of OAM mode groups may also be understood as a quantity of inter-group transport layers of the P antenna port groups. Therefore, the quantity of OAM mode groups in Table 1 may also be replaced with the quantity of inter-group transport layers.

Optionally, the correspondence between the second precoding matrix and an element in the third precoding matrix may be a one-to-one correspondence, that is, one precoding matrix corresponds to one element in the third precoding matrix.

Optionally, one of the P*V second precoding matrices is used as an example. That a correspondence exists between the second precoding matrix and an element in a third precoding matrix includes: the second precoding matrix corresponds to an element in an $i^{th}$ row and a $j^{th}$ column in the third precoding matrix, the second precoding matrix is a matrix of M rows and N columns, M is a quantity of antenna ports included in an $i^{th}$ antenna port group in the P antenna port groups, N is a quantity of OAM modes included in a $j^{th}$ OAM mode group in the V OAM mode groups, M is a positive integer greater than 1, N is a positive integer less than or equal to M, i is a positive integer less than or equal to P, and j is a positive integer less than or equal to V.

Further, that the second precoding matrix corresponds to an element in an $i^{th}$ row and a $j^{th}$ column in the third precoding matrix includes: a location of the second precoding matrix in the first precoding matrix is the same as a location of the element in the $i^{th}$ row and the $j^{th}$ column in the third precoding matrix. Therefore, a quantity of columns in the first precoding matrix is a quantity of OAM modes included in all the V OAM mode groups, and each column in the first precoding matrix corresponds to one OAM mode.

It should be noted that, because an OAM mode included in each of the V OAM mode groups may be the same as an OAM mode included in another OAM mode group, an OAM mode corresponding to each column in the first precoding matrix may be the same as an OAM mode corresponding to another column. In addition, the quantity of columns in the first precoding matrix may be represented as a total quantity of OAM layers (OAM-TotalLayer).

For example, if the quantity P of antenna port groups of the transmit end apparatus is 2, a $1^{st}$ antenna port group includes 4 antenna ports whose identifiers are 1 to 4, a $2^{nd}$ antenna port group includes 4 antenna ports whose identifiers are 5 to 8, the quantity V of OAM mode groups is 2, a $1^{st}$ OAM mode group is [0, 1] and a $2^{nd}$ OAM mode group is [0, 1, 2], the third precoding matrix is a matrix of 2 rows and 2 columns, and the first precoding matrix includes 2*2 (namely, 4) second precoding matrices. That the third precoding matrix is $$\frac{1}{\sqrt{2}}\begin{bmatrix}1 & 0\\0 & 1\end{bmatrix}$$

is used as an example. In this case, in the 4 second precoding matrices included in the first precoding matrix:

A quantity of rows of a second precoding matrix $F_{1,1}^{H}$ corresponding to an element "1" in a $1^{st}$ row and a $1^{st}$ column in the third precoding matrix is the quantity 4 of antenna ports included in the $1^{st}$ antenna port group, and a quantity of columns thereof is a quantity 2 of OAM modes included in the $1^{st}$ OAM mode group, that is, $F_{1,1}^{H}$ is a matrix of 4 rows and 2 columns, namely, $$F_{1,1}^{H} = \begin{pmatrix}a_{1,1} & a_{1,2}\\a_{2,1} & a_{2,2}\\a_{3,1} & a_{3,2}\\a_{4,1} & a_{4,2}\end{pmatrix}.$$

A quantity of rows of a second precoding matrix $F_{1,2}^{H}$ corresponding to an element "0" in the $1^{st}$ row and a $2^{nd}$ column in the third precoding matrix is the quantity 4 of antenna ports included in the $1^{st}$ antenna post group, and a quantity of columns thereof is a quantity 3 of OAM modes included in the $2^{nd}$ OAM mode group, that is, $F_{1,2}^{H}$ is a matrix of 4 rows and 3 columns, namely, $$F_{1,2}^{H} = \begin{pmatrix}b_{1,1} & b_{1,2} & b_{1,3}\\b_{2,1} & b_{2,2} & b_{2,3}\\b_{3,1} & b_{3,2} & b_{3,3}\\b_{4,1} & b_{4,2} & b_{4,3}\end{pmatrix}.$$

A quantity of rows of a second precoding matrix $F_{2,1}^{H}$ corresponding to an element "0" in a $2^{nd}$ row and the $1^{st}$ column in the third precoding matrix is the quantity 4 of antenna ports included in the $2^{nd}$ antenna port group, and a quantity of columns thereof is the quantity 2 of OAM modes included in the $1^{st}$ OAM mode group, that is, $F_{2,1}^{H}$ is a matrix of 4 rows and 2 columns, namely, $$F_{2,1}^{H} = \begin{pmatrix}c_{1,1} & c_{1,2}\\c_{2,1} & c_{2,2}\\c_{3,1} & c_{3,2}\\c_{4,1} & c_{4,2}\end{pmatrix}.$$

A quantity of rows of a second precoding matrix $F_{2,2}^H$ corresponding to an element "0" in the $2^{nd}$ row and the $2^{nd}$ column in the third precoding matrix is the quantity 4 of antenna ports included in the $2^{nd}$ antenna port group, and a quantity of columns thereof is the quantity 3 of OAM modes included in the $2^{nd}$ OAM mode group, that is, $F_{2,2}^H$ is a matrix of 4 rows and 3 columns, namely, $$F_{2,2}^H = \begin{pmatrix} d_{1,1} & d_{1,2} & d_{1,3} \\ d_{2,1} & d_{2,2} & d_{2,3} \\ d_{3,1} & d_{3,2} & d_{3,3} \\ d_{4,1} & d_{4,2} & d_{4,3} \end{pmatrix}.$$

In addition, because a location of a second precoding matrix in the first precoding matrix is the same as a location of an element of the third precoding matrix that corresponds to the second precoding matrix in the third precoding matrix, the first precoding matrix is $$\frac{1}{\sqrt{2}} \begin{bmatrix} F_{1,1}^H & F_{1,2}^H \\ F_{2,1}^H & F_{2,2}^H \end{bmatrix}.$$

The foregoing solution provides a firm of the second precoding matrix and a location of the second precoding matrix in the first precoding matrix. For an element in the second precoding matrix, one of the P*V second precoding matrices is used as an example. Optionally, if the element in the $i^{th}$ row and the $j^{th}$ column in the third precoding matrix that corresponds to the second precoding matrix is 0, all elements in the second precoding matrix are 0; or if the element in the $i^{th}$ row and the $j^{th}$ column is not 0, an element in an $x^{th}$ row and a $y^{th}$ column in the second precoding matrix is a product of a first value and the element in the $i^{th}$ row and the $j^{th}$ column, and the first value is determined by an azimuth of an array element, corresponding to an $x^{th}$ antenna port in the $i^{th}$ antenna port group, relative to a first array center and a $y^{th}$ OAM mode in the $j^{th}$ OAM mode group, where the first array center is an array center of an antenna array corresponding to the $i^{th}$ antenna port group in the antenna array of the transmit end apparatus, x is a positive integer less than or equal to M, and y is a positive integer less than or equal to N.

For example, based on the foregoing example, the elements in $F_{1,2}^H$ and $F_{2,1}^H$ are all 0, and the elements in $f_{1,1}^H$ and $F_{2,2}^H$ each are determined based on an OAM mode and an azimuth corresponding to an array element corresponding to an antenna port.

S404. The receive end apparatus sends first indication information to the transmit end apparatus. Correspondingly, the transmit end apparatus receives the first indication information from the receive end apparatus.

The first indication information is used to indicate the first precoding matrix, and the first precoding matrix is used to precode first data.

Optionally, in a possible implementation, the first indication information may include the quantity V of the OAM mode groups, an identifier of the third precoding matrix, a quantity of OAM modes included in each of the V OAM mode groups, and an identifier of each OAM mode group.

In another possible implementation, the first indication information may include one or more of the quantity V of the OAM mode groups, an identifier of the third precoding matrix, a quantity of OAM modes included in each of the V OAM mode groups, or an identifier of each OAM mode group. In this case, information not included in the first indication information may be inferred based on information included in the first indication information. For example, the first indication information may include the identifier of the third precoding matrix, the quantity of OAM modes included in each of the V OAM mode groups, and the identifier of each OAM mode group, and the quantity V of the OAM mode groups may be obtained based on the quantity of OAM modes included in each OAM mode group.

Optionally, the quantity V of the OAM mode groups may be represented by a group index (group index, GpIn), the identifier of the third precoding matrix may be represented by PMI_1, the quantity of OAM modes included in each OAM mode group may be represented by a mode index (mode index. MdIn), and the identifier of each OAM mode group may be represented by PMI_2.

For example, based on the example in step S404, information indicated by the first indication information is GpIn=2, PMI_1=0, MdIn=[2, 3], and PMI_2=[0, 1].

Optionally, the receive end apparatus may include the first indication information in a CSI report and send the CSI report to the transmit end apparatus, or may separately send the first indication information to the transmit end apparatus. This is not specifically limited in this embodiment of this application.

S405. The transmit end apparatus determines the first preceding matrix based on the first indication information.

Optionally, when the first indication information includes the quantity V of the OAM mode groups, the identifier of the third precoding matrix, the quantity of OAM modes included in each of the V OAM mode groups, and the identifier of each OAM mode group, the transmit end apparatus may first determine the third precoding matrix based on the quantity V of the OAM mode groups, the quantity P of antenna port groups, and the identifier of the third precoding matrix, determine the P*V second precoding matrices based on the third precoding matrix, the quantity of OAM modes included in each OAM mode group, and the identifier of each OAM mode group, and finally determine the first precoding matrix based on the correspondence between the second precoding matrix and the element in the third precoding matrix that is described in step S403.

Optionally, after step S405, the precoding matrix determining method provided in this embodiment of this application may further include the following steps S406 and S407.

S406. The transmit end apparatus precodes first data based on the first precoding matrix.

The first data is to-be-sent data obtained after layer mapping, and the first data may include a plurality of data streams.

In the following embodiments of this application, data obtained after the transmit end apparatus precodes the first data based on the first precoding matrix is referred to as an OAM signal. A unified description is provided herein, and details are not described in the following embodiments.

Optionally, when a terminal device serves as the transmit end apparatus, that the transmit end apparatus precodes first data based on the first precoding matrix may include: the transmit end apparatus precodes the first data by using the first precoding matrix. In this case, a quantity of data streams included in the first data is the same as the quantity of columns in the first precoding matrix.

When a network device serves as the transmit end apparatus, that the transmit end apparatus precodes first data based on the first precoding matrix may include: the transmit end apparatus determines a fourth precoding matrix based on the first precoding matrix, and precodes the first data by using the fourth precoding matrix. In other words, that the first precoding matrix is used to precode the first data may be understood as follows: the first precoding matrix is used to determine the fourth precoding matrix, and the fourth precoding matrix is used to precode the first data. In this case, a quantity of data streams included in the first data is the same as a quantity of columns in the fourth precoding matrix.

Optionally, the fourth precoding matrix may be the same as the first precoding matrix, or may be formed by some columns in the first precoding matrix. It may be understood that, in an extreme case, there may be a case in which the fourth precoding matrix is totally different from the first precoding matrix. For example, the network device finds during scheduling that OAM modes corresponding to the columns in the first precoding matrix are all occupied. In this case, the fourth precoding matrix finally determined by the network device may be totally different from the first precoding matrix.

S407. The transmit end apparatus sends an OAM signal to the receive end apparatus. Correspondingly, the receive end apparatus receives the OAM signal from the transmit end apparatus.

At this time, transmission of the plurality of data streams between the transmit end apparatus and the receive end apparatus is completed.

It should be noted that, in this embodiment of this application, when P is equal to 1 and V is equal to 1, it indicates that all the antenna ports of the transmit end apparatus are used to transmit one group of OAM modes; or when P is unequal to 1 and V is equal to 1, it indicates that the P antenna port groups of the transmit end apparatus are used to transmit one OAM mode group.

Based on this solution, OAM modes may be introduced into a precoding matrix, so that OAM is integrated into a precoding process of conventional MIMO, thereby improving performance of the conventional MIMO by using the OAM in MIMO communication, and further improving spectral efficiency.

In an implementation scenario of this embodiment of this application, before step S403, in the precoding matrix determining method provided in this embodiment of this application, the receive end apparatus determines, based on the CSI of the first channel, whether a line of sight exists in the first channel. If no line of sight exists, a precoding scheme of conventional MIMO is performed. For a detailed scheme, refer to the existing technologies. Details are not described herein again. If a line of sight exists, the precoding matrix determining method shown in FIG. 4 above continues to be performed. That is, the precoding matrix determining method provided in this embodiment of this application further includes: the receive end apparatus determines, based on the CSI of the first channel, that a line of sight exists in the first channel.

Optionally, when the CSI of the first channel includes a channel matrix corresponding to the first channel, the receive end apparatus may determine, in the following manners, that a line of sight exists in the first channel:

Manner 1: If a difference between a rank of the channel matrix corresponding to the first channel and 1 is less than a first threshold, the receive end apparatus determines that a line of sight exists in the first channel.

Manner 2: If a rank of the channel matrix corresponding to the first channel is less than a second threshold, the receive end apparatus determines that a line of sight exists in the first channel.

Manner 3: If a ratio of a maximum singular value to a minimum singular value is greater than a third threshold, the receive end apparatus determines that a line of sight exists in the first channel. The maximum singular value and the minimum singular value are obtained by performing singular value decomposition on the channel matrix corresponding to the first channel. The ratio of the maximum singular value to the minimum singular value may also be referred to as a condition number (condition number).

It should be noted that, the receive end apparatus may determine, based on any one of the foregoing three manners or any combination of the foregoing three manners, that a line of sight exists in the first channel. For example, in combination of manner 1 with manner 3, when the difference between the rank of the channel matrix corresponding to the first channel and 1 is less than the first threshold, and the ratio of the maximum singular value to the minimum singular value is greater than the third threshold, the receive end apparatus determines that a line of sight exists in the first channel. Alternatively, in combination of manner 2 with manner 3, when the rank of the channel matrix corresponding to the first channel is less than the second threshold, and the ratio of the maximum singular value to the minimum singular value is greater than the third threshold, the receive end apparatus determines that a line of sight exists in the first channel.

It may be understood that, when the channel matrix corresponding to the first channel meets any one or more conditions described in the foregoing three manners, it is also possible that a strongest reflection path exists in the first channel. In this case, the receive end apparatus and the transmit end apparatus may also perform the precoding matrix determining method shown in FIG. 4, provided that corresponding phase compensation is performed on the channel.

Based on this solution, in a scenario with a line of sight existing in a channel, the first precoding matrix provided in this embodiment of this application is used to precode to-be-sent data, thereby improving performance of conventional MIMO by using OAM, and improving spectral efficiency.

Figure 5:
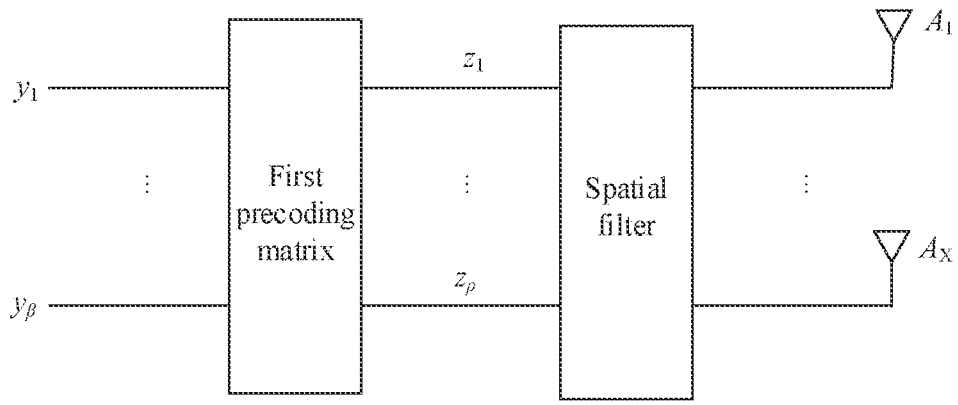
FIG. 5 is a schematic diagram of a process of mapping data to physical antennas according to an embodiment of this application.

For example, FIG. 5 shows a process of mapping data to physical antennas in the precoding matrix determining method according to an embodiment of this application. Data obtained after layer mapping is precoded by using the first precoding matrix or the fourth precoding matrix (in FIG. 5, for example, the first precoding matrix is used as an example for description), and then is mapped to antenna ports. Afterwards, the data on the antenna ports is mapped to physical antennas by using a spatial filter, and transmitted by using the physical antennas. $y_1, \ldots, y_\beta$ are the data obtained after layer mapping. $z_1, \ldots, z_\rho$ are the antenna ports, $A_1, \ldots, A_x$ are the physical antennas, $\beta$ is a quantity of columns of the first precoding matrix or the fourth precoding matrix, x is a positive integer, and $\rho$ is a quantity of antenna ports included in all the P antenna port groups of the transmit end apparatus.

In another implementation scenario of this embodiment of this application, an axis of the transmit end apparatus is not aligned with that of the receive end apparatus, or interference exists in a channel. In this scenario, when receiving the OAM signal, the receive end apparatus generates inter-mode crosstalk, which affects OAM signal demodulation. Therefore, when performing the precoding matrix determining method shown in FIG. 4, the receive end apparatus and the transmit end apparatus may perform phase compensation with reference to a method shown in FIG. 6.

Figure 6:
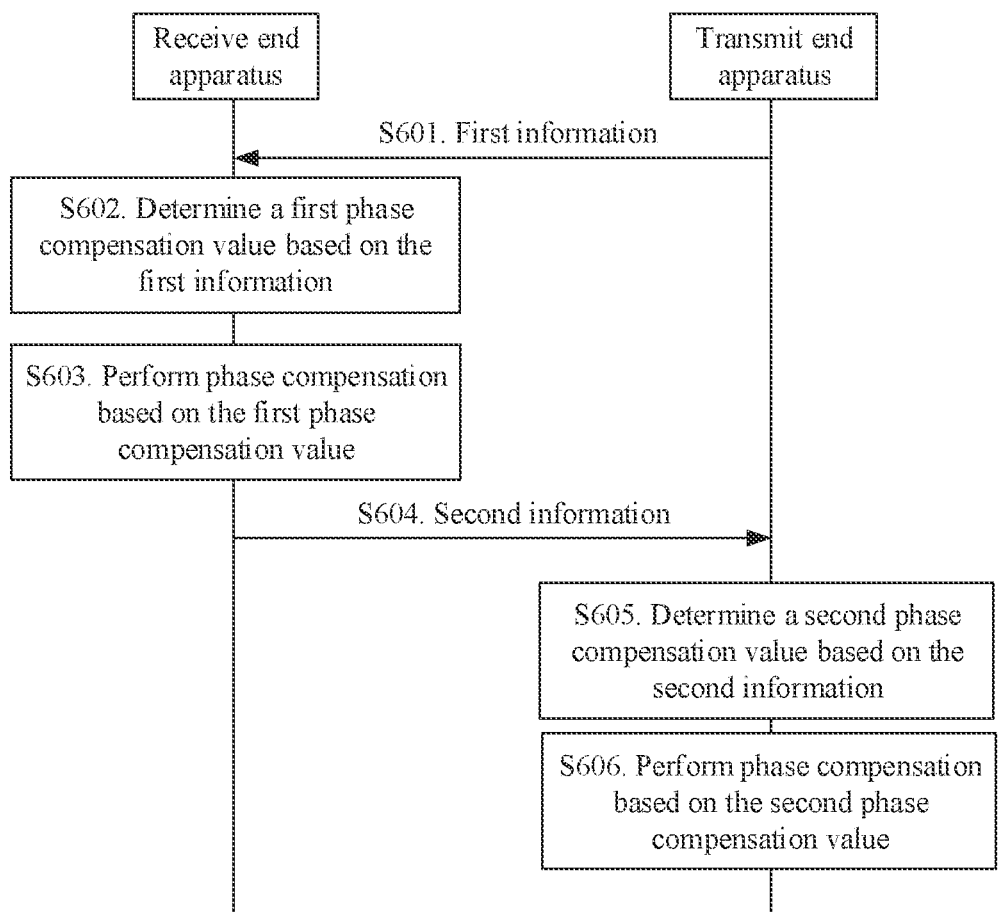
FIG. 6 is a schematic flowchart of a phase compensation method according to an embodiment of this application.

The method shown in FIG. 6 includes the following steps.

S601. The transmit end apparatus sends first information to the receive end apparatus. Correspondingly, the receive end apparatus receives the first information from the transmit end apparatus.

The first information may be a first phase reference signal, or the first information may be information about a direction of the receive end apparatus relative to the transmit end apparatus and location information of the antenna array of the transmit end apparatus. The location information of the antenna array of the transmit end apparatus indicates a location of the antenna array of the transmit end apparatus in a first reference coordinate system. The first reference coordinate system may be a coordinate system of a positioning system (for example, a GPS positioning system) shared by the transmit end apparatus and the receive end apparatus.

S602. The receive end apparatus determines a first phase compensation value based on the first information.

Optionally, when the first information is the first phase reference signal, the receive end apparatus determines a first direction based on the first phase reference, and then determines the first phase compensation value based on the first direction. The first direction is a direction of the transmit end apparatus relative to the receive end apparatus. The first phase compensation value is a phase compensation value corresponding to the receive end apparatus.

S603. The receive end apparatus performs phase compensation based on the first phase compensation value.

Step S603 may be performed before the receive end apparatus performs OAM demodulation on the received OAM signal.

S604. The receive end apparatus sends second information to the transmit end apparatus. Correspondingly, the transmit end apparatus receives the second information from the receive end apparatus.

The second information may be a second phase reference signal, or the first information may be information about the first direction and location information of an antenna array of the receive end apparatus. The location information of the antenna array of the receive end apparatus indicates a location of the antenna array of the receive end apparatus in the first reference coordinate system.

S605. The transmit end apparatus determines a second phase compensation value based on the second information.

Optionally, when the second information is the second phase reference signal, the transmit end apparatus determines a second direction based on the second phase reference, and then determines the second phase compensation value based on the second direction. The second direction is the direction of the receive end apparatus relative to the transmit end apparatus. The second phase compensation value is a phase compensation value corresponding to the transmit end apparatus. Optionally, after determining the second phase compensation value, the transmit end apparatus may perform step S606. Alternatively, that the transmit end apparatus determines a fourth precoding matrix based on the first precoding matrix in step S406 may include: the transmit end apparatus determines the fourth precoding matrix based on the first preceding matrix and the second phase compensation value.

S606. The transmit end apparatus performs phase compensation based on the second phase compensation value.

That is, after determining the second direction and the second phase compensation value, the transmit end apparatus may first perform transmit end phase compensation, and then precode the first data based on the first precoding matrix, to be specific, perform step S606 and then step S406.

It should be noted that, there is no necessary sequence between steps S601 to S603 and steps S604 to S606. Steps S601 to S603 may be performed before steps S604 to S606. In this case, in step S601, the first information may be the first phase reference signal, and in step S604, the receive end apparatus may send the second information to the transmit end apparatus in the first direction. Alternatively, steps S604 to S606 may be performed before steps S601 to S603. In this case, in step S601, the transmit end apparatus may send the first information to the receive end apparatus in the second direction, and in step S604, the second information may be the second phase reference signal.

Based on this solution, the receive end apparatus and the transmit end apparatus may be enabled to perform phase compensation, so as to reduce inter-mode crosstalk of the receive end apparatus, and improve an OAM signal demodulation capability of the receive end apparatus.

In still another implementation scenario of this embodiment of this application, the transmit end apparatus is a network device, and the receive end apparatus is a first terminal device.

Optionally, in this scenario, after the first terminal device determines the first precoding matrix, the precoding matrix determining method provided in this embodiment of this application further includes the following:

The first terminal device determines, based on the first precoding matrix, the CSI of the first channel, and a receiving capability of the first terminal device, a CQI group corresponding to the first precoding matrix, and sends the CQI group to the network device.

The CQI group includes a CQI corresponding to each of OAM modes corresponding to the first precoding matrix, and the OAM modes corresponding to the first precoding matrix are OAM modes respectively corresponding to all columns in the first preceding matrix.

It should be noted that, the OAM modes respectively corresponding to all the columns in the first preceding matrix may include identical OAM modes. For example, the first precoding matrix includes 5 columns, and OAM modes corresponding to these columns are respectively 0, 1, 0, 1, and −1.

In this case, in a possible case, CQIs corresponding to identical OAM modes may be the same. Correspondingly, the CQI group may include a CQI corresponding to each of the identical OAM modes, that is, the CQI group includes same CQIs, or the identical OAM modes correspond to one CQI in the CQI group.

For example, in the first precoding matrix, a CQI corresponding to the OAM mode "0" corresponding to a $1^{st}$ column is the same as a CQI corresponding to the OAM mode "0" corresponding to a $3^{rd}$ column; and a CQI corresponding to the OAM mode "1" corresponding to a $2^{nd}$ column is the same as a CQI corresponding to the OAM mode "1" corresponding to a $4^{1'}$ column. In this case, the CQI group may include 5 CQIs, where a first CQI is the same as a third CQI, and a second CQI is the same as a fourth CQI. Alternatively, the CQI group may include 3 different CQIs, where a first CQI corresponds to the OAM mode "0" corresponding to the $1^{st}$ column and the $3^{rd}$ column in the first precoding matrix, a second CQI corresponds to the OAM mode "1" corresponding to the $2^{nd}$ column and the 4$^{th}$ column in the first precoding matrix, and a third CQI corresponds to the OAM mode "−1".

In another possible case, CQIs corresponding to identical OAM modes may be different. Correspondingly, the CQI group includes the different CQIs corresponding to the identical OAM modes. The receiving capability of the first terminal device may be a receiving capability of the first terminal device for data transmitted in different OAM modes, for example, a hardware configuration of the first terminal device and a demodulation algorithm capability for the data transmitted in the different OAM modes.

Optionally, the CQI corresponding to each of the OAM modes corresponding to the first precoding matrix may indicate a modulation scheme and a code rate corresponding to data sent in the OAM mode. For example, generally, if the OAM mode is a high OAM mode, the CQI corresponding to the OAM mode may indicate a low-order modulation scheme and a low code rate, that is, a modulation scheme corresponding to data sent in the high OAM mode is a low-order modulation scheme, and a code rate corresponding to the data is a low code rate; or if the OAM mode is a low OAM mode, the CQI corresponding to the OAM mode may indicate a high-order modulation scheme and a high code rate, that is, a modulation scheme corresponding to data sent in the low OAM mode is a high-order modulation scheme, and a code rate corresponding to the data is a high code rate.

Further, during subsequent layer mapping, an OAM mode to be used by the to-be-sent data may be first determined, and then a CQI corresponding to the OAM mode may be obtained from the foregoing CQI group. The to-be-sent data is modulated and rate-matched by using a modulation scheme and a code rate that are indicated by the CQI, to obtain symbols corresponding to the to-be-sent data. Finally, the symbols are mapped to a transport layer corresponding to the OAM mode corresponding to the CQI.

Based on this solution, a data modulation scheme and a data code rate may be adjusted based on an OAM mode and a CQI, thereby improving data transmission flexibility and increasing a transmission rate.

In yet another implementation scenario of this embodiment of this application, the transmit end apparatus is a terminal device, and the receive end apparatus is a network device. In this scenario, the first indication information in this embodiment of this application may also be referred to as a transmit precoding matrix indicator (transmitted precoding matrix indicator, TPMI).

In a still yet another implementation scenario of this embodiment of this application, the receive end apparatus is a network device, and the transmit end apparatus is a first terminal device. In addition to communicating with the first terminal device, the network device further communicates with one or more other terminal devices. In other words, this implementation scenario is a multi-user uplink transmission scenario.

It should be noted that, in this embodiment of this application, a scenario in which a terminal device sends data to a network device is referred to as an uplink transmission scenario, and correspondingly, a channel on which the terminal device sends the data to the network device is referred to as an uplink channel; and a scenario in which a network device sends data to a terminal device is referred to as a downlink transmission scenario, and correspondingly, a channel on which the network device sends the data to the terminal device is referred to as a downlink channel. A unified description is provided herein, and details are not described in the following embodiments.

Optionally, in this scenario, the network device separately determines, based on CSI of an uplink channel between each terminal device and the network device, a precoding matrix corresponding to each terminal device. The precoding matrix corresponding to each terminal device is used by the terminal device to precode to-be-sent uplink data. In this case, the network device may comprehensively consider the CSI of each terminal device, and determine a different precoding matrix for each terminal device or different precoding matrices for some terminal devices.

That is, in this scenario, the first precoding matrix is used by the first terminal device to precode the first data, the first precoding matrix is different from a precoding matrix indicated by the network device to a second terminal device, the second terminal device is one or more terminal devices served by the network device other than the first terminal device, the precoding matrix indicated by the network device to the second terminal device is determined by the network device based on CSI of a second channel, and the second channel is used by the second terminal device to send data to the network device.

Based on this solution, because the network device schedules different precoding matrices for a plurality of terminal devices communicating with the network device, interference between users can be reduced during simultaneous co-channel transmission.

In a further implementation scenario of this embodiment of this application, the transmit end apparatus is a network device, and the receive end apparatus is a first terminal device. In addition to communicating with the first terminal device, the network device further communicates with one or more other terminal devices. In other words, this implementation scenario is a multi-user downlink transmission scenario.

Optionally, in this scenario, each terminal device communicating with the network device may perform the method shown in FIG. 4, to send the first indication information to the network device. After receiving a CSI report reported by each terminal device and the first indication information, the network device may separately determine a precoding matrix corresponding to each terminal device with reference to the CSI report of each terminal device and the first indication information. The precoding matrix is used to precode downlink data when the network device sends the downlink data to the terminal device. The precoding matrix corresponding to each terminal device determined by the network device may be different.

That is, in this scenario, the fourth precoding matrix determined by the network device based on the first precoding matrix is used to precode the first data when the network device sends the first data to the first terminal device. The fourth precoding matrix is different from a fifth precoding matrix. The fifth precoding matrix is determined by the network device based on a sixth precoding matrix indicated by a second terminal device to the network device. The second terminal device is one or more terminal devices served by the network device other than the first terminal device. The sixth precoding matrix is determined by the second terminal device based on CSI of a third channel when the second terminal device executes the embodiment shown in FIG. 4. The third channel is used by the network device to send data to the second terminal device.

Based on this solution, because the network device schedules different precoding matrices for a plurality of terminal devices communicating with the network device, interference between users can be reduced during simultaneous co-channel transmission.

It should be noted that, the method shown in FIG. 4 provided in this embodiment of this application may be implemented in any one of the plurality of implementation scenarios described above, or may be implemented in any combination of a plurality of scenarios that have no logical conflict in the plurality of implementation scenarios described above. In this case, the method provided in each scenario in the scenario combination may be executed in combination.

It may be understood that, the plurality of implementation scenarios described above in this embodiment of this application are merely example descriptions, and impose no limitation on the method shown in FIG. 4 provided in this application. The method shown in FIG. 4 may also be implemented in another scenario.

Figure 7:
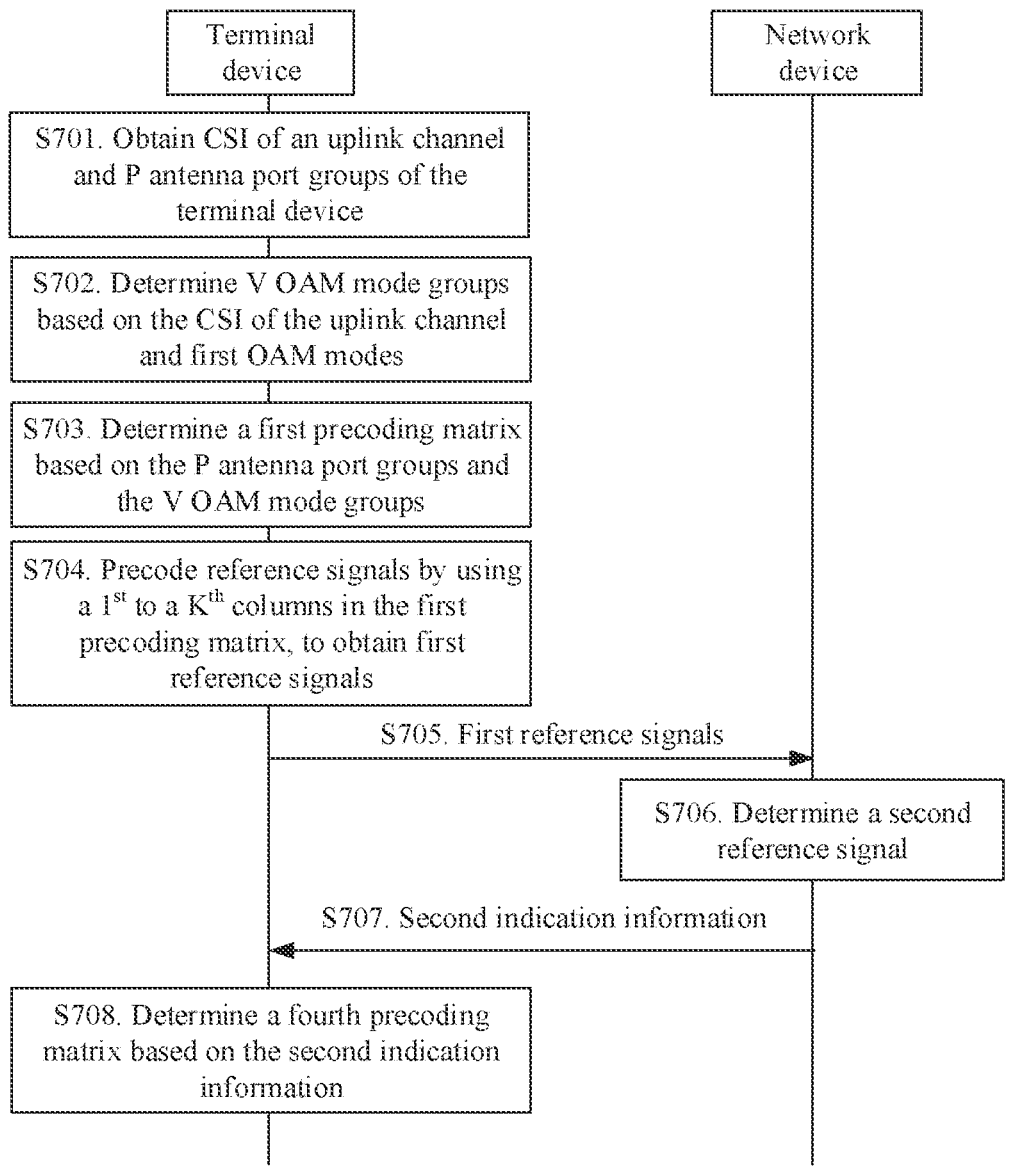
FIG. 7 is a schematic flowchart of another precoding matrix determining method according to an embodiment of this application.

Optionally, that the transmit end apparatus is a terminal device and the receive end apparatus is a network device is used as an example. FIG. 7 shows another precoding matrix determining method according to an embodiment of this application. The precoding matrix determining method includes the following steps.

S701. A terminal device determines CSI of an uplink channel and P antenna port groups of the terminal device.

Optionally, that a terminal device obtains CSI of an uplink channel includes: the terminal device obtains the CSI of the uplink channel based on channel reciprocity and CSI of a downlink channel.

That a terminal device determines P antenna port groups of the terminal device may include: the terminal device determines, based on information about an antenna array of the terminal device, a quantity P of the antenna port groups and antenna ports included in each of the P antenna port groups.

S702 and S703 are similar to steps S402 and S403 in the embodiment shown in FIG. 4, and a difference lies in that steps S402 and S403 are performed by the receive end apparatus, while steps S702 and S703 are performed by the transmit end apparatus, that is, the terminal device. For related descriptions, refer to the foregoing steps S402 and S403. Details are not described herein again.

S704. The terminal device precodes reference signals by using a $1^{st}$ to a $K^{th}$ columns in the first precoding matrix, to obtain first reference signals.

A meaning of the first precoding matrix is the same as that of the first precoding matrix in the embodiment shown in FIG. 4. For related descriptions, refer to the related descriptions in the embodiment shown in FIG. 4. The reference signals in this embodiment may be SRSs. K is a quantity of columns in the first precoding matrix, and the first reference signals include K precoded reference signals.

S705. The terminal device sends the first reference signals to the network device. Correspondingly, the network device receives the first reference signals from the terminal device.

S706. The network device determines a second reference signal.

The second reference signal is some or all reference signals in the first reference signals.

Optionally, after receiving the first reference signals from the terminal device, the network device may select one or more precoded reference signals in the K precoded reference signals included in the received first reference signals as the second reference signal.

Optionally, the network device may select, based on signal quality of the received K precoded reference signals, one or more precoded reference signals with relatively good quality from the K precoded reference signals. Alternatively, the network device may determine the second reference signal from the first reference signals in another manner. This is not specifically limited in this embodiment of this application.

Optionally, in a multi-user scenario in which a plurality of terminal devices communicate with the network device, the network device may determine a different second reference signal for each terminal device with reference to first reference signals sent by each terminal device communicating with the network device.

S707. The network device sends second indication information to the terminal device. Correspondingly, the terminal device receives the second indication information from the network device.

The second indication information is used to indicate the second reference signal. Optionally, the second indication information may be an SRI, that is, the network device may indicate the second reference signal by using the SRI.

S708. The terminal device determines a fourth precoding matrix based on the second indication information.

The fourth precoding matrix is a matrix finally used by the terminal device to precode data obtained after layer mapping.

Optionally, that the terminal device determines a fourth precoding matrix based on the second indication information may be as follows: the terminal device determines the second reference signal based on the second indication information, and determines one or more columns corresponding to the second reference signal in the first precoding matrix as columns forming the second precoding matrix.

Optionally, after step S708, the terminal device may precode the first data by using the fourth precoding matrix, and send a signal obtained after precoding the first data to the network device.

The first data is to-be-sent data obtained after layer mapping, and the first data may include a plurality of data streams. For example, a quantity of the data streams included in the first data is the same as a quantity of columns in the fourth precoding matrix.

Based on this solution, OAM modes may be introduced into a precoding matrix, and further a precoding problem in integrating MIMO and OAM into communication is resolved, thereby improving performance of conventional MIMO by using the OAM in MIMO communication, and further improving spectrum utilization.

It should be noted that, an implementation scenario of the embodiment shown in FIG. 4 is also applicable to the embodiment shown in FIG. 7. Therefore, the methods provided in the foregoing various implementation scenarios may also be performed with reference to the method shown in FIG. 7.

It should be noted that, the precoding matrix determining method provided in this embodiment of this application is related to an antenna array of the transmit end apparatus. Therefore, in this embodiment of this application, array elements corresponding to a first antenna port group in the antenna array of the transmit end apparatus are not distributed on a same straight line. The first antenna port group is any one of the P antenna port groups of the transmit end apparatus.

Figure 8:
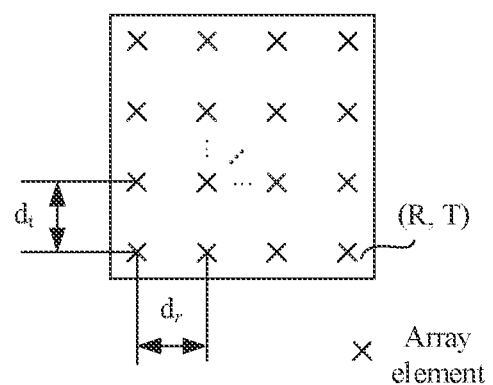
FIG. 8 is a schematic diagram of an antenna array of a transmit end device according to an embodiment of this application.

In addition, the antenna array of the transmit end apparatus may be a circular array, a grid array, or a spiral array. For example, FIG. 8 shows a grid antenna array according to an embodiment of this application. The grid antenna array includes R*T array elements, and a spacing between any two array elements in a horizontal direction is $d_r$, and a spacing between any two array elements in a vertical direction is $d_t$.

The following describes the precoding matrix determining method provided in this embodiment of this application by using a specific example.

For example, Table 3 lists possible values (three decimal places are reserved for all data) of $F_i^H$ provided in this embodiment of this application, where a row represents antenna ports in the antenna port group, and a column represents an OAM mode.

TABLE 3

|   | −2 | −1 | 0 | 1 | 2 |
|---|---|---|---|---|---|
| 1  | 1.000 + 0.000i  | 1.000 + 0.000i  | 1.000 + 0.000i | 1.000 + 0.000i  | 1.000 + 0.000i  |
| 2  | 0.707 − 0.707i  | 0.924 − 0.383i  | 1.000 + 0.000i | 0.924 + 0.383i  | 0.707 + 0.707i  |
| 3  | 0.000 − 1.000i  | 0.707 − 0.707i  | 1.000 + 0.000i | 0.707 + 0.707i  | 0.000 + 1.000i  |
| 4  | −0.707 − 0.707i | 0.383 − 0.924i  | 1.000 + 0.000i | 0.383 + 0.924i  | −0.707 + 0.707i |
| 5  | −1.000 + 0.000i | 0.000 − 1.000i  | 1.000 + 0.000i | 0.000 + 1.000i  | −1.000 + 0.000i |
| 6  | −0.707 + 0.707i | −0.383 − 0.924i | 1.000 + 0.000i | −0.383 + 0.924i | −0.707 − 0.707i |
| 7  | 0.000+ 1.000i   | −0.707 − 0.707i | 1.000 + 0.000i | −0.707 + 0.707i | 0.000 − 1.000i  |
| 8  | 0.707 + 0.707i  | −0.924 − 0.383i | 1.000 + 0.000i | −0.924 + 0.383i | 0.707 − 0.707i  |
| 9  | 1.000 + 0.000i  | −1.000 + 0.000i | 1.000 + 0.000i | −1.000 + 0.000i | 1.000 + 0.000i  |
| 10 | 0.707 − 0.707i  | −0.924 + 0.383i | 1.000 + 0.000i | −0.924 − 0.383i | 0.707 + 0.707i  |
| 11 | 0.000 − 1.000i  | −0.707 + 0.707i | 1.000 + 0.000i | −0.707 − 0.707i | 0.000 + 1.000i  |
| 12 | −0.707 − 0.707i | −0.383 + 0.924i | 1.000 + 0.000i | −0.383 − 0.924i | −0.707 + 0.707i |
| 13 | −1.000 + 0.000i | 0.000 + 1.000i  | 1.000 + 0.000i | 0.000− 1.000i   | −1.000 + 0.000i |
| 14 | −0.707 + 0.707i | 0.383 + 0.924i  | 1.000 + 0.000i | 0.383 − 0.924i  | −0.707 − 0.707i |
| 15 | 0.000 + 1.000i  | 0.707 + 0.707i  | 1.000 + 0.000i | 0.707 − 0.707i  | 0.000 − 1.000i  |
| 16 | 0.707 + 0.707i  | 0.924 + 0.383i  | 1.000 + 0.000i | 0.924 − 0.383i  | 0.707 − 0.707i  |

Figure 9:
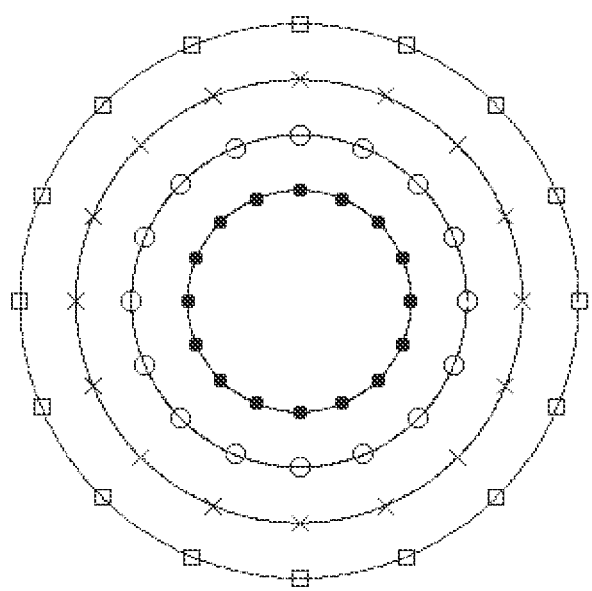
FIG. 9 is a schematic diagram of an antenna array of another transmit end device according to an embodiment of this application.

As shown in FIG. 9, it is assumed that the antenna array of the transmit end apparatus and that of the receive end apparatus are the same. The antenna array of each of the transmit end apparatus and the receive end apparatus includes four concentric uniform circular arrays (uniform circular arrays, UCAs). Each UCA array includes 16 array elements, and the 16 array elements are evenly spaced. A phase and an amplitude of each array element are adjustable.

It is assumed that one UCA of the transmit end apparatus corresponds to one antenna port group, that is, a quantity of the antenna port groups of the transmit end apparatus is 4, each antenna port group includes 16 antenna ports, a quantity of OAM mode groups is 4, each OAM mode group includes 5 OAM modes [−2, −1, 0, 1, 2], and a third precoding matrix is $$\begin{pmatrix} 1 & 0 & 0 & 0 \\ 0 & 1 & 0 & 0 \\ 0 & 0 & 1 & 0 \\ 0 & 0 & 0 & 1 \end{pmatrix}.$$

In this case, the first precoding matrix used to precode the first data is $$F^H = \begin{pmatrix} F_1^H & 0 & 0 & 0 \\ 0 & F_2^H & 0 & 0 \\ 0 & 0 & F_3^H & 0 \\ 0 & 0 & 0 & F_4^H \end{pmatrix}.$$

Herein, it is assumed that the transmit end apparatus finally uses the first precoding matrix to precode the first data, where each 0 in $f^H$ presents a matrix of 0s with 16 rows and 5 columns, is a matrix of 16 rows and 5 columns, a value of is determined based on an azimuth of array elements, corresponding to an antenna port group, relative to an array center of an antenna array corresponding to the $i^{th}$ antenna port group in the antenna arrays of the transmit end apparatus and OAM modes included in a $j^{th}$ OAM mode group.

It is assumed that the first data obtained after layer mapping is a matrix x with 20 rows and 1 column, which indicates that the first data includes 20 data streams, and precoded data mapped to an antenna array for sending is s. In this case, $s = F^H x$.

Correspondingly, at a receive end, a signal received by the receive end apparatus is $y = F(Hs+n) = FHF^H x + ñ$, where F represents a decoding matrix for receiving the OAM signal, F is determined by the first precoding matrix, and F and the first precoding matrix are complex conjugate transposed matrices of each other; and H represents a channel matrix corresponding to a first channel, $H = [H_{j,i}]$, i=1,2,3,4, j=1,2,3,4, $H_{j,i}$ represents a channel matrix between an $i^{th}$ UCA of the transmit end apparatus and a $j^{th}$ UCA of the receive end apparatus that is included in the channel matrix corresponding to the first channel, and n and ñ are noise vectors.

Because data transmitted in identical OAM modes is superposed, the receive end apparatus first demodulates a received signal to obtain superposed data transmitted in each OAM mode, and the data may be represented as $\Sigma_j = [\sigma_{l,i,j,i}]$, where $\sigma_{l,i,j,i}$ represents data that is received in an $l^{th}$ mode of the $j^{th}$ UCA of the receiving device and that is sent in an $l^{th}$ mode of the $i^{th}$ UCA of the transmit end apparatus, $\sigma_{l,i,j,i}$ is an $l^{th}$ diagonal matrix element in $\Sigma_{j,i} = F_j H_{j,i} F_i^H$, $F_j$ is a decoding matrix corresponding to the $j^{th}$ UCA of the receive end apparatus, $F_i^H$ and is a second precoding matrix corresponding to the $i^{th}$ UCA of the transmit end apparatus.

After the receive end apparatus obtains, through demodulation, the superposed data transmitted in each OAM mode, each data stream is extracted in an equalization manner. A plurality of data streams that are transmitted in the $l^{th}$ OAM mode and that are obtained after equalization may be represented as $y_l = W_l \Sigma_l x_l + W_l I_l + W_l ñ$. Therefore, after the data transmitted in each OAM mode is equalized, all the 20 data streams sent by the transmit end apparatus can be extracted. $x_l$ is data modulated by the transmit end apparatus and transmitted in the $l^{th}$ OAM mode. $I_l$ is interference caused by a signal in another OAM mode and on another antenna, and $W_l$ is a filter coefficient.

For example, Table 4 lists possible filter coefficients $W_l$ (three decimal places are reserved for all data) corresponding to different OAM modes provided in this embodiment of this application.

TABLE 4

| Mode −2 | | | |
|---|---|---|---|
| −6.418 + 6.739i | 0.718 + 2.577i | −0.357 − 0.638i | 1.200 − 6.707i |
| 0.718 + 2.577i | −36.324 − 9.953i | 6.799 + 0.544i | 12.613 + 11.029i |
| −0.357 − 0.638i | 6.799 + 0.544i | −1.468 + 0.208i | −10.019 − 5.801i |
| 1.200 − 6.707i | 12.613 + 11.029i | −10.019 − 5.801i | −1.310 − 3.0161 |

| Mode −1 | | | |
|---|---|---|---|
| 7.538 + 7161i | −19.951 + 5.569i | −9.315 + 4.632i | 1.772 + 0.293i |
| −19.951 + 5.569i | 1.040 − 2.606i | 0.236 + 2.776i | −6.574 + 7.82.3i |
| −9.315 + 4.632i | 0.236 4 2.776i | −4.730 − 43.262i | −11.730 + 20.668i |
| 1.772 + 0.293i | −6.574 + 7.823i | −11.730 + 20.668i | −3.803 + 1.7571 |

| Mode 0 | | | |
|---|---|---|---|
| −5.584 + 5.898i | −0.804 − 2.689i | −1711 − 3.448i | −0.315 + 1.723i |
| −0.804 − 2.689i | −3.391 − 0.749i | −3.888 − 0.329i | −7.968 − 7.099i |
| −1.711 − 3.448i | −3.888 − 0329i | −0.871 + 0.124i | 7.188 + 4.260i |
| −0.315 + 1.723i | −7.968 − 7.099i | 7.188 + 4.260i | 0.653 + 1.607i |

| Mode 1 | | | |
|---|---|---|---|
| 7.538 + 7.161i | −19.951 + 5.569i | −9.315 + 4.632i | 1772 + 0.293i |
| −19.951 + 5.569i | 1.040 − 2.606i | 0.236 + 2.776i | −6.574 + 7.823i |
| −9.315 + 4.632i | 0.236 + 2.776i | −4.730 − 43.262i | −11.730 + 20.668i |
| 1.772 + 0.293i | −6.574 + 7.823i | −11.730 + 20.668i | −3.803 + 1.757i |

| Mode 2 | | | |
|---|---|---|---|
| 6.418 + 6.739i | 0.718 + 2.577i | −0.357 − 0.638i | 1.200 − 6.707i |
| 0.718 + 2.577i | 36.324 − 9.953i | 6.799 + 0.544i | 12.613 + 11.029i |
| −0.357 − 0.638i | 6.799 + 0.544i | −1.468 + 0.208i | −10.019 − 5.801i |
| 1.2.00 − 6.707i | 12.613 + 11.029i | −10.019 − 5.801i | −1.310 − 3.016i |

It may be understood that in the embodiments of this application, the receive end apparatus and/or the transmit end apparatus may perform some or all steps in the embodiments of this application. These steps or operations are merely examples. In the embodiments of this application, other operations or variations of various operations may be further performed. In addition, the steps may be performed in a sequence different from a sequence presented in the embodiments of this application, and not all the operations in the embodiments of this application may be performed.

In the embodiments of this application, unless otherwise stated or there is a logic conflict, terms and/or descriptions in different embodiments are consistent and may be mutually referenced, and technical features in different embodiments may be combined based on an internal logical relationship of the embodiments, to form a new embodiment.

It may be understood that, in the foregoing embodiments, the methods and/or steps implemented by the receive end apparatus may also be implemented by a component (for example, a chip or a circuit) that may be used for the receive end apparatus, and the methods and/or steps implemented by the transmit end apparatus may also be implemented by a component that may be used for the transmit end apparatus.

The foregoing mainly describes the solutions provided in the embodiments of this application from a perspective of interaction between network elements. Correspondingly, an embodiment of this application further provides a communications apparatus. The communications apparatus is configured to implement the foregoing methods. The communications apparatus may be the receive end apparatus in the foregoing method embodiments, an apparatus including the receive end apparatus, or a component that may be used, for the receive end apparatus. Alternatively, the communications apparatus may be the transmit end apparatus in the foregoing method embodiments, an apparatus including the transmit end apparatus, or a component that may be used for the transmit end apparatus. It may be understood that, to implement the foregoing functions, the communications apparatus includes a corresponding hardware structure and/or software module for performing the functions. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on a particular application and a design constraint condition of the technical solutions. A person skilled in the art may use different methods to implement the described functions for each particular application, but it should not be considered that the implementation goes beyond the scope of this application.

In the embodiments of this application, the communications apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that in the embodiments of this application, division into the modules is an example and is merely logical function division, and may be another division in an actual implementation.

Figure 10:
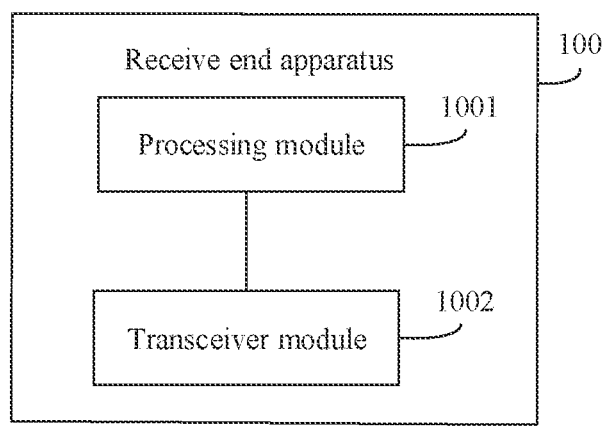
FIG. 10 is a schematic diagram of a structure of a receive end device according to an embodiment of this application.

For example, that the communications apparatus is the receive end apparatus in the foregoing method embodiments is used as an example. FIG. 10 is a schematic structural diagram of a receive end apparatus 100. The receive end apparatus 100 includes a processing module 1001 and a transceiver module 1002. The transceiver module 1002 may also be referred to as a transceiver unit, and is configured to implement a sending and/or receiving function, for example, may be a transceiver circuit, a transceiver machine, a transceiver, or a communications interface.

The transceiver module 1002 may include a receiving module and a sending module, which are respectively configured to perform receiving and sending steps performed by the receive end apparatus in the foregoing method embodiments. The processing module 1001 may be configured to perform steps other than the receiving and sending steps performed by the receive end apparatus in the foregoing method embodiments.

For example, the processing module 1001 is configured to obtain channel state information (CSI) of a first channel and information about P antenna port groups of a transmit end apparatus, where P is a positive integer; the processing module 1001 is further configured to determine V orbital angular momentum (OAM) mode groups based on the CSI of the first channel and first OAM modes, where the first OAM modes are OAM modes supported by both the transmit end apparatus and the receive end apparatus, and V is a positive integer less than or equal to P; the processing module 1001 is further configured to determine a first precoding matrix based on the P antenna port groups and the V OAM mode groups, where the first precoding matrix includes P*V second preceding matrices, and the first precoding matrix is used to precode first data; and the transceiver module 1002 is configured to send first indication information to the transmit end apparatus, where the first indication information is used to indicate the first preceding matrix.

Optionally, the processing module 1001 is further configured to determine, based on the CSI of the first channel, that a line of sight exists in the first channel.

Optionally, the CSI of the first channel includes a channel matrix corresponding to the first channel; and that the processing module 1001 is further configured to determine, based on the CSI of the first channel, that a line of sight exists in the first channel includes: if a difference between a rank of the channel matrix corresponding to the first channel and 1 is less than a first threshold, or the rank of the channel matrix corresponding to the first channel matrix is less than a second threshold, the processing module 1001 is further configured to determine that a line of sight exists in the first channel.

Optionally, the CSI of the first channel includes a channel matrix corresponding to the first channel; and that the processing module 1001 is further configured to determine, based on the CSI of the first channel, that a line of sight exists in the first channel includes: if a ratio of a maximum singular value to a minimum singular value is greater than a third threshold, the processing module 1001 is further configured to determine, based on the CSI of the first channel, that a line of sight exists in the first channel, where the maximum singular value and the minimum singular value are obtained by performing singular value decomposition on the channel matrix corresponding to the first channel.

Optionally, the CSI of the first channel includes a channel matrix corresponding to the first channel; and that the processing module 1001 is further configured to determine, based on the CSI of the first channel, that a line of sight exists in the first channel includes: if a difference between a rank of the channel matrix corresponding to the first channel and 1 is less than a first threshold, and a ratio of a maximum singular value to a minimum singular value is greater than a third threshold, the processing module 1001 is further configured to determine, based on the CSI of the first channel, that a line of sight exists in the first channel; or if a rank of the channel matrix corresponding to the first channel matrix is less than a second threshold, and a ratio of the maximum singular value to the minimum singular value is greater than a third threshold, the processing module 1001 is further configured to determine, based on the CSI of the first channel, that a line of sight exists in the first channel.

Optionally, the transceiver module 1002 is further configured to receive first information from the transmit end apparatus, where the first information is a first phase compensation value, or the first information is information about a direction of the receive end apparatus relative to the transmit end apparatus and location information of an antenna array of the transmit end apparatus; the processing module 1001 is further configured to determine the first phase compensation value based on the first information, where the first phase compensation value is a phase compensation value corresponding to the receive end apparatus; and the processing module 1001 is further configured to perform phase compensation based on the first phase compensation value.

Optionally, when the receive end apparatus 100 serves as a first terminal device, the processing module 1001 is further configured to determine, based on the first precoding matrix, the CSI of the first channel, and a receiving capability of the first terminal device, a channel quality indicator (CQI) group corresponding to the first precoding matrix, where the CQI group includes a CQI corresponding to each of OAM modes corresponding to the first precoding matrix; and the transceiver module 1002 is further configured to send the CQI group to the network device.

All related content of the steps in the foregoing method embodiments may be cited in function descriptions of the corresponding functional modules. Details are not described herein again.

In this embodiment, the receive end apparatus 100 is presented in a form of functional modules obtained through division in an integrated manner. The "module" herein may be a specific ASIC, a circuit, a processor that executes one or more software or firmware programs and a memory, an integrated logic circuit, and/or another component that can provide the foregoing functions. In a simple embodiment, if a terminal device serves as the receive end apparatus, a person skilled in the art may figure out that the receive end apparatus 100 may use a form of the terminal device 30 shown in FIG. 2B.

For example, the processor 301 in the terminal device 30 shown in FIG. 2B may invoke the computer-executable instructions stored in the memory 302, so that the terminal device 30 performs the precoding matrix determining method in the foregoing method embodiments.

Specifically, the processor 301 in the terminal device 30 shown in FIG. 2B may invoke the computer-executable instructions stored in the memory 302, to implement functions/implementation processes of the processing module 1001 and the transceiver module 1002 in FIG. 10. Alternatively, the processor 301 in the terminal device 30 shown in FIG. 2B may invoke the computer-executable instructions stored in the memory 302, to implement a function/an implementation process of the processing module 1001 in FIG. 10, and the transceiver 303 in the terminal device 30 shown in FIG. 2B may implement a function/an implementation process of the transceiver module 1002 in FIG. 10.

The receive end apparatus 100 provided in this embodiment may perform the foregoing precoding matrix determining method. Therefore, for technical effects that can be achieved by the receive end apparatus 100, refer to the foregoing method embodiments. Details are not described herein again.

Figure 11:
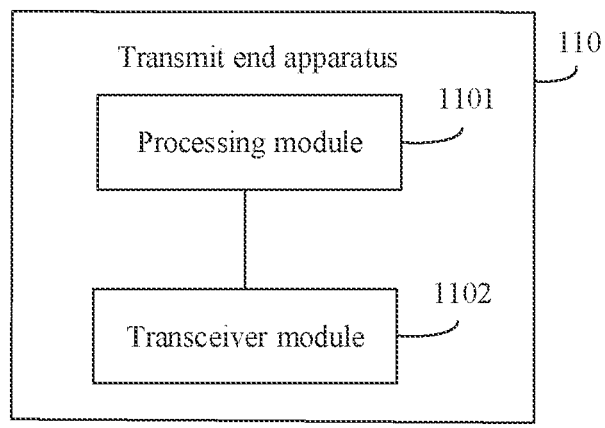
FIG. 11 is a schematic diagram of a structure of a transmit end device according to an embodiment of this application.

Alternatively, for example, that the communications apparatus is the transmit end apparatus in the foregoing method embodiments is used as an example. FIG. 11 is a schematic structural diagram of a transmit end apparatus 110. The transmit end apparatus 110 includes a processing module 1101 and a transceiver module 1102. The transceiver module 1102 may also be referred to as a transceiver unit, and is configured to implement a sending and/or receiving function, for example, may be a transceiver circuit, a transceiver machine, a transceiver, or a communications interface.

The transceiver module 1102 may include a receiving module and a sending module, which are respectively configured to perform receiving and sending steps performed by the receive end apparatus in the foregoing method embodiments. The processing module 1101 may be configured to perform steps other than the receiving and sending steps performed by the receive end apparatus in the foregoing method embodiments.

For example, the transceiver module 1102 is configured to receive first indication information from a receive end apparatus, where the first indication information is used to indicate a first precoding matrix, the first precoding matrix includes P*V second precoding matrices, the first precoding matrix is used to precode first data, P represents a quantity of antenna port groups of the transmit end apparatus, V represents a quantity of orbital angular momentum (OAM) mode groups, P is a positive integer, and V is a positive integer less than or equal to P; and the processing module 1001 is configured to determine the first precoding matrix based on the first indication information.

Optionally, the processing module 1101 is further configured to determine the P antenna port groups of the transmit end apparatus based on information about an antenna array of the transmit end apparatus, and the transceiver module 1102 is further configured to send information about the P antenna port groups of the transmit end apparatus to the receive end apparatus.

Optionally, the transceiver module 1102 is further configured to receive second information from the receive end apparatus, where the second information is a second phase compensation value, or the second information is information about a direction of the transmit end apparatus relative to the receive end apparatus and location information of an antenna array of the receive end apparatus; the processing module 1101 is further configured to determine the second phase compensation value based on the second information, where the second phase compensation value is a phase compensation value corresponding to the transmit end apparatus; and the processing module 1101 is further configured to perform phase compensation based on the second phase compensation value.

All related content of the steps in the foregoing method embodiments may be cited in function descriptions of the corresponding functional modules. Details are not described herein again.

In this embodiment, the transmit end apparatus 110 is presented in a form of functional modules obtained through division in an integrated manner. The "module" herein may be a specific ASIC, a circuit, a processor that executes one or more software or firmware programs and a memory, an integrated logic circuit, and/or another component that can provide the foregoing functions. In a simple embodiment, if a network device serves as the transmit end apparatus, a person skilled in the art may figure out that the transmit end apparatus 110 may use a form of the network device 20 shown in FIG. 2B.

For example, the processor 201 in the network device 20 shown in FIG. 2B may invoke the computer-executable instructions stored in the memory 202, so that the network device 20 performs the preceding matrix determining method in the foregoing method embodiments.

Specifically, the processor 201 in the network device 20 shown in FIG. 2B may invoke the computer-executable instructions stored in the memory 202, to implement functions/implementation processes of the processing module 1101 and the transceiver module 1102 in FIG. 11. Alternatively, the processor 201 in the network device 20 shown in FIG. 2B may invoke the computer-executable instructions stored in the memory 202, to implement a function/an implementation process of the processing module 1101 in FIG. 11, and the transceiver 203 in the network device 20 shown in FIG. 2B may implement a function/an implementation process of the transceiver module 1102 in FIG. 11.

The transmit end apparatus 110 provided in this embodiment may perform the foregoing precoding matrix determining method. Therefore, for technical effects that can be achieved by the transmit end apparatus 110, refer to the foregoing method embodiments. Details are not described herein again.

Optionally, an embodiment of this application further provides a communications apparatus (for example, the communications apparatus may be a chip or a chip system). The communications apparatus includes a processor, configured to implement the method in any one of the foregoing method embodiments. In a possible design, the communications apparatus further includes a memory. The memory is configured to store necessary program instructions and data. The processor may invoke program code stored in the memory, to instruct the communications apparatus to perform the method in any one of the foregoing method embodiments. Certainly, the memory may not be in the communications apparatus. In another possible design, the communications apparatus further includes an interface circuit. The interface circuit is a code/data read write interface circuit, and the interface circuit is configured to: receive computer-executable instructions (where the computer-executable instructions are stored in a memory, and may be directly read from the memory or through another component), and transmit the computer-executable instructions to the processor. When the communications apparatus is a chip system, the communications apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like. In this embodiment of this application, the computer may include the foregoing apparatus.

Although this application is described with reference to the embodiments, in a process of implementing this application that claims protection, a person skilled in the art may understand and implement other variations of the disclosed embodiments by viewing the accompanying drawings, disclosed content, and the appended claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. It is clear that, a person skilled in the art can make various modifications and variations to this application without departing from the spirit and scope of this application. This application is intended to cover these modifications and variations of this application provided that they fall within the scope of the following claims of this application and their equivalent technologies.

What is claimed is:

1. A precoding matrix determining method, wherein the method comprises:
    obtaining, by a receive end apparatus, channel state information (CSI) of a first channel and information about P antenna port groups of a transmit end apparatus, wherein P is a positive integer;
    determining, by the receive end apparatus, V orbital angular momentum (OAM) mode groups based on the CSI of the first channel and first OAM modes, wherein the first OAM modes are OAM modes supported by both the transmit end apparatus and the receive end apparatus, and V is a positive integer less than or equal to P;
    determining, by the receive end apparatus, a first precoding matrix based on the P antenna port groups and the V OAM mode groups, wherein the first precoding matrix comprises P*V second precoding matrices, and the first precoding matrix is used to precode first data; and
    sending, by the receive end apparatus, first indication information, wherein the first indication information indicates the first precoding matrix.

2. The method according to claim 1, wherein a correspondence exists between a second precoding matrix and an element in a third precoding matrix, and the third precoding matrix is a matrix of P rows and V columns.

3. The method according to claim 2, wherein the second precoding matrix corresponds to an element in an $i^{th}$ row and a $j^{th}$ column in the third precoding matrix, the second precoding matrix is one of the P*V second precoding matrices, the second precoding matrix is a matrix of M rows and N columns, M is a quantity of antenna ports comprised in an $i^{th}$ antenna port group in the P antenna port groups, N is a quantity of OAM modes comprised in a $j^{th}$ OAM mode group in the V OAM mode groups, M is a positive integer greater than 1, N is a positive integer less than or equal to M, i is a positive integer less than or equal to P, and j is a positive integer less than or equal to V.

4. The method according to claim 2, wherein the first indication information comprises a quantity of the V OAM mode groups, an identifier of the third precoding matrix, a quantity of OAM modes comprised in each of the V OAM mode groups, and an identifier of each OAM mode group.

5. The method according to claim 1, wherein the method further comprises:
    determining, by the receive end apparatus based on the CSI of the first channel, that a line of sight exists in the first channel.

6. The method according to claim 5, wherein the CSI of the first channel comprises a channel matrix corresponding to the first channel, and determining, by the receive end apparatus based on the CSI of the first channel, that a line of sight exists in the first channel comprises:
    if a difference between a rank of the channel matrix corresponding to the first channel and 1 is less than a first threshold, or the rank of the channel matrix corresponding to the first channel is less than a second threshold, determining, by the receive end apparatus, that a line of sight exists in the first channel.

7. The method according to claim 5, wherein the CSI of the first channel comprises a channel matrix corresponding to the first channel, and determining, by the receive end apparatus based on the CSI of the first channel, that a line of sight exists in the first channel comprises:
    if a ratio of a maximum singular value to a minimum singular value is greater than a third threshold, determining, by the receive end apparatus, that a line of sight exists in the first channel, wherein the maximum singular value and the minimum singular value are obtained by performing singular value decomposition on the channel matrix corresponding to the first channel.

8. The method according to claim 5, wherein the CSI of the first channel comprises a channel matrix corresponding to the first channel, and determining, by the receive end apparatus based on the CSI of the first channel, that a line of sight exists in the first channel comprises:
    if a difference between a rank of the channel matrix corresponding to the first channel and 1 is less than a first threshold, and a ratio of a maximum singular value to a minimum singular value is greater than a third threshold, determining, by the receive end apparatus, that a line of sight exists in the first channel, wherein the maximum singular value and the minimum singular value are obtained by performing singular value decomposition on the channel matrix corresponding to the first channel; or
    if a rank of the channel matrix corresponding to the first channel is less than a second threshold, and a ratio of the maximum singular value to the minimum singular value is greater than a third threshold, determining, by the receive end apparatus, that a line of sight exists in the first channel.

9. The method according to claim 1, wherein the method further comprises:

receiving, by the receive end apparatus, first information from the transmit end apparatus, wherein the first information is a first phase compensation value, or the first information is information about a direction of the receive end apparatus relative to the transmit end apparatus and location information of an antenna array of the transmit end apparatus;

determining, by the receive end apparatus, the first phase compensation value based on the first information, wherein the first phase compensation value is a phase compensation value corresponding to the receive end apparatus; and performing, by the receive end apparatus, phase compensation based on the first phase compensation value.

10. The method according to claim 1, wherein the receive end apparatus is a first terminal device, the transmit end apparatus is a network device, and the method further comprises:

determining, by the first terminal device based on the first precoding matrix, the CSI of the first channel, and a receiving capability of the first terminal device, a channel quality indicator (CQI) group corresponding to the first precoding matrix, wherein the CQI group comprises a CQI corresponding to each of OAM modes corresponding to the first precoding matrix; and sending, by the first terminal device, the CQI group to the network device.

11. The method according to claim 1, wherein the receive end apparatus is a network device, the transmit end apparatus is a first terminal device, the first precoding matrix is different from a precoding matrix indicated by the network device to a second terminal device, the second terminal device is one or more terminal devices served by the network device other than the first terminal device, the precoding matrix indicated by the network device to the second terminal device is determined by the network device based on CSI of a second channel, and the second channel is used by the second terminal device to send data to the network device.

12. A precoding matrix determining method, wherein the method comprises:

receiving, by a transmit end apparatus, first indication information from a receive end apparatus, wherein the first indication information indicates a first precoding matrix, the first precoding matrix comprises P*V second precoding matrices, a correspondence exists between a second precoding matrix and an element in a third precoding matrix, the third precoding matrix is a matrix of P rows and V columns, P represents a quantity of antenna port groups of the transmit end apparatus, V represents a quantity of orbital angular momentum (OAM) mode groups, P is a positive integer, and V is a positive integer less than or equal to P; and determining, by the transmit end apparatus, the first precoding matrix based on the first indication information, wherein the first precoding matrix is used to precode first data.

13. The method according to claim 12, wherein the second precoding matrix corresponds to an element in an $i^{th}$ row and a $j^{th}$ column in the third precoding matrix, the second precoding matrix is one of the P*V second precoding matrices, the second precoding matrix is a matrix of M rows and N columns, M is a quantity of antenna ports comprised in an $i^{th}$ antenna port group in the P antenna port groups, N is a quantity of OAM modes comprised in a $j^{th}$ OAM mode group in the V OAM mode groups, M is a positive integer greater than 1, N is a positive integer less than or equal to M, i is a positive integer less than or equal to P, and j is a positive integer less than or equal to V.

14. The method according to claim 12, wherein the first indication information comprises a quantity of the V OAM mode groups, an identifier of the third precoding matrix, a quantity of OAM modes comprised in each of the V OAM mode groups, and an identifier of each OAM mode group.

15. The method according to claim 12, wherein the method further comprises:

determining, by the transmit end apparatus, the P antenna port groups of the transmit end apparatus based on information about an antenna array of the transmit end apparatus; and sending, by the transmit end apparatus, information about the P antenna port groups of the transmit end apparatus to the receive end apparatus.

16. The method according to claim 12, wherein the method further comprises:

receiving, by the transmit end apparatus, second information from the receive end apparatus, wherein the second information is a second phase reference signal, or the second information is information about a direction of the transmit end apparatus relative to the receive end apparatus and location information of an antenna array of the receive end apparatus;

determining, by the transmit end apparatus, a second phase compensation value based on the second information, wherein the second phase compensation value is a phase compensation value corresponding to the transmit end apparatus; and performing, by the transmit end apparatus, phase compensation based on the second phase compensation value.

17. The method according to claim 12, wherein the first precoding matrix is used to determine a fourth precoding matrix, and the fourth precoding matrix is used to precode the first data.

18. The method according to claim 17, wherein the transmit end apparatus is a network device, the receive end apparatus is a first terminal device, the fourth precoding matrix is different from a fifth precoding matrix, the fifth precoding matrix is determined by using a sixth precoding matrix indicated by a second terminal device to the network device, the second terminal device is one or more terminal devices served by the network device other than the first terminal device, the sixth precoding matrix is determined by using CSI of a third channel, and the third channel is used by the network device to send data to the second terminal device.

19. A communications apparatus, wherein the communications apparatus comprises:

at least one processor; and one or more memories coupled to the at least one processor and storing computer-executable instructions for execution by the at least one processor to cause the communications apparatus to perform operations comprising:

obtaining channel state information (CSI) of a first channel and information about P antenna port groups of a transmit end apparatus, wherein P is a positive integer;

determining V orbital angular momentum (OAM) mode groups based on the CSI of the first channel and first OAM modes, wherein the first OAM modes are OAM modes supported by both the transmit end apparatus and the communications apparatus, and V is a positive integer less than or equal to P;

determining a first precoding matrix based on the P antenna port groups and the V OAM mode groups, wherein the first precoding matrix comprises P*V second precoding matrices, and the first precoding matrix is used to precode first data; and sending first indication information, wherein the first indication information indicates the first precoding matrix.

* * * * *